US009230394B2

(12) United States Patent
Jarvis et al.

(10) Patent No.: US 9,230,394 B2
(45) Date of Patent: Jan. 5, 2016

(54) MULTIPLE REEL ROULETTE GAME

(71) Applicant: IGT, Las Vegas, NV (US)

(72) Inventors: Eugene Jarvis, Glenview, IL (US); Andrew Eloff, Evanston, IL (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/258,600

(22) Filed: Apr. 22, 2014

(65) Prior Publication Data

US 2014/0228093 A1 Aug. 14, 2014

Related U.S. Application Data

(63) Continuation of application No. 12/979,050, filed on Dec. 27, 2010, now Pat. No. 8,727,862, which is a continuation of application No. 12/391,833, filed on Feb. 24, 2009, now Pat. No. 7,901,280, which is a continuation of application No. 11/119,997, filed on May 2, 2005, now Pat. No. 7,553,233, which is a continuation of application No. 10/319,774, filed on Dec. 13, 2002, now Pat. No. 6,890,255.

(60) Provisional application No. 60/341,548, filed on Dec. 17, 2001.

(51) Int. Cl.

| | |
|---|---|
| ***G06F 17/00*** | (2006.01) |
| ***G07F 17/32*** | (2006.01) |
| ***G07F 17/34*** | (2006.01) |
| ***A63F 13/30*** | (2014.01) |

(52) U.S. Cl.

CPC ................ *G07F 17/32* (2013.01); *A63F 13/12* (2013.01); *G07F 17/34* (2013.01)

(58) Field of Classification Search

USPC ..................................................... 463/16–25

See application file for complete search history.

(56) References Cited

U.S. PATENT DOCUMENTS

| | | | |
|---|---|---|---|
| 1,578,412 | A | 3/1926 | Ewig |
| 3,628,259 | A | 12/1971 | Kahn |
| 3,819,186 | A | 6/1974 | Hinterstocker |

(Continued)

FOREIGN PATENT DOCUMENTS

| | | |
|---|---|---|
| AU | B-13331/88 | 9/1988 |
| AU | PO7780 | 7/1997 |

(Continued)

OTHER PUBLICATIONS

"A Salute to Game Shows," The Price is Right—Pricing Games, printed from schuminweb.com/game-shows/shows/price-is-right/pricing-games.htm on Mar. 16, 2001.

(Continued)

*Primary Examiner* — Ronald Laneau

(74) *Attorney, Agent, or Firm* — Neal, Gerber & Eisenberg LLP

(57) ABSTRACT

A gaming system which is operable to receive an input associated with at least one betting option specified by a roulette betting layout. A plurality of roulette reels are rotatable about a common axis, and each one of the roulette reels has a side display surface or side wall. Each one of the side display surfaces or side walls displays a plurality of numerals which are spaced apart along the side display surface or side wall. The numerals are associated with the roulette betting layout. An outcome occurs based upon one or more indicated numerals.

22 Claims, 9 Drawing Sheets

(56) References Cited

U.S. PATENT DOCUMENTS 4,077,631 A 3/1978 Tela, Sr.
4,156,976 A 6/1979 Mikun
4,198,052 A 4/1980 Gauselmann
4,222,561 A 9/1980 Whitten
4,260,159 A 4/1981 Hoffman
4,337,945 A 7/1982 Levy
4,448,419 A 5/1984 Telnaes
4,621,814 A 11/1986 Stepan et al.
4,624,459 A 11/1986 Kaufman
4,669,731 A 6/1987 Clarke
4,695,053 A 9/1987 Vazquez, Jr. et al.
4,732,386 A 3/1988 Rayfiel
4,805,907 A 2/1989 Hagiwara
4,836,546 A 6/1989 DiRe et al.
4,838,552 A 6/1989 Hagiwara
4,840,375 A 6/1989 Lawlor et al.
4,880,237 A 11/1989 Kishita
4,906,005 A 3/1990 Manabe
4,941,665 A 7/1990 Klamer
4,989,878 A 2/1991 Davies
4,991,848 A 2/1991 Greenwood et al.
5,011,159 A 4/1991 Fortunato et al.
5,019,973 A 5/1991 Wilcox et al.
5,046,735 A 9/1991 Hamano et al.
5,085,436 A 2/1992 Bennett
5,088,737 A 2/1992 Frank et al.
5,102,134 A 4/1992 Smyth
5,102,135 A 4/1992 Addiechi
5,116,055 A 5/1992 Tracy
5,123,649 A 6/1992 Tiberio
5,131,655 A 7/1992 Ugawa
5,152,529 A 10/1992 Okada
5,167,413 A 12/1992 Fulton
5,184,821 A 2/1993 Korenek
5,197,736 A 3/1993 Backus et al.
5,224,706 A 7/1993 Bridgeman et al.
5,259,616 A 11/1993 Bergmann
5,294,120 A 3/1994 Schultz
5,294,128 A 3/1994 Marquez
5,308,065 A 5/1994 Bridgeman et al.
5,332,228 A 7/1994 Schultz
5,342,047 A 8/1994 Heidel et al.
5,344,144 A 9/1994 Canon
5,356,140 A 10/1994 Dabrowski et al.
5,375,830 A 12/1994 Takemoto et al.
5,377,973 A 1/1995 Jones et al.
5,393,057 A 2/1995 Marnell, II
5,393,061 A 2/1995 Manship et al.
5,395,111 A 3/1995 Inoue
5,397,125 A 3/1995 Adams
5,401,023 A 3/1995 Wood
5,405,143 A 4/1995 Takemoto et al.
5,407,200 A 4/1995 Zalabak
5,415,404 A 5/1995 Joshi et al.
5,423,539 A 6/1995 Nagao
5,431,408 A 7/1995 Adams
5,437,452 A 8/1995 Graf et al.
5,449,173 A 9/1995 Thomas et al.
5,456,465 A 10/1995 Durham
5,489,101 A 2/1996 Moody
5,509,655 A 4/1996 Ugawa
5,511,781 A 4/1996 Wood et al.
5,531,448 A 7/1996 Moody
5,540,442 A 7/1996 Orselli et al.
5,542,669 A 8/1996 Charron et al.
5,553,851 A 9/1996 Malavazos et al.
5,560,603 A 10/1996 Seelig et al.
5,569,084 A 10/1996 Nicastro et al.
5,570,885 A 11/1996 Ornstein
5,580,055 A 12/1996 Hagiwara
5,584,486 A 12/1996 Franklin
5,584,763 A 12/1996 Kelly et al.
5,584,764 A 12/1996 Inoue
5,588,650 A 12/1996 Eman et al.
5,593,161 A 1/1997 Boylan et al.
5,611,535 A 3/1997 Tiberio
5,630,585 A 5/1997 Takemoto et al.
5,636,837 A 6/1997 Takemoto et al.
5,636,838 A 6/1997 Caro
5,639,089 A 6/1997 Matsumoto et al.
5,645,485 A 7/1997 Clapper, Jr.
5,647,798 A 7/1997 Falciglia
5,655,961 A 8/1997 Acres et al.
5,678,001 A 10/1997 Nagel et al.
5,707,285 A 1/1998 Place et al.
5,711,715 A 1/1998 Ringo et al.
5,718,431 A 2/1998 Ornstein
5,720,662 A 2/1998 Holmes, Jr. et al.
5,722,891 A 3/1998 Inoue
5,725,428 A 3/1998 Achmüller
5,732,950 A 3/1998 Moody
5,743,798 A 4/1998 Adams et al.
5,755,440 A 5/1998 Sher
5,766,074 A 6/1998 Cannon et al.
5,769,716 A 6/1998 Saffari et al.
5,770,533 A 6/1998 Franchi
5,772,506 A 6/1998 Marks et al.
5,772,509 A 6/1998 Weiss
5,775,692 A 7/1998 Watts et al.
5,788,573 A 8/1998 Baerlocher et al.
5,791,987 A 8/1998 Chen et al.
5,807,172 A 9/1998 Piechowiak
5,810,361 A 9/1998 Kadlic
5,816,916 A 10/1998 Moody
5,816,918 A 10/1998 Kelly et al.
5,817,172 A 10/1998 Yamada et al.
5,823,873 A 10/1998 Moody
5,823,874 A 10/1998 Adams
D400,597 S 11/1998 Hedrick et al.
5,833,537 A 11/1998 Barrie
5,836,583 A 11/1998 Towers
5,839,955 A 11/1998 Mangano et al.
5,848,932 A 12/1998 Adams
5,855,514 A 1/1999 Kamille
5,857,909 A 1/1999 Rubin
5,868,619 A 2/1999 Wood et al.
5,876,284 A 3/1999 Acres et al.
5,882,105 A 3/1999 Barlow
5,882,258 A 3/1999 Kelly et al.
5,882,261 A 3/1999 Adams
5,890,962 A 4/1999 Takemoto
5,902,184 A 5/1999 Bennett
5,910,048 A 6/1999 Feinberg
5,911,418 A 6/1999 Adams
5,918,880 A 7/1999 Voigt, IV et al.
5,934,672 A 8/1999 Sines et al.
5,934,999 A 8/1999 Valdez
5,935,002 A 8/1999 Falciglia
5,947,820 A 9/1999 Morro et al.
5,951,397 A 9/1999 Dickinson
5,954,335 A 9/1999 Moody
5,964,463 A 10/1999 Moore, Jr.
5,967,893 A 10/1999 Lawrence et al.
5,971,849 A 10/1999 Falciglia
5,976,016 A 11/1999 Moody et al.
5,980,384 A 11/1999 Barrie
5,984,310 A 11/1999 English
5,984,781 A 11/1999 Sunaga
5,984,782 A 11/1999 Inoue
5,988,638 A 11/1999 Rodesch et al.
5,993,316 A 11/1999 Coyle et al.
5,997,401 A 12/1999 Crawford
6,003,867 A 12/1999 Rodesch et al.
6,004,207 A 12/1999 Wilson, Jr. et al.
6,007,066 A 12/1999 Moody
6,007,424 A 12/1999 Evers et al.
6,012,720 A 1/2000 Webb
6,012,981 A 1/2000 Fujioka et al.
6,012,982 A 1/2000 Piechowiak et al.
6,012,983 A 1/2000 Walker et al.
6,032,955 A 3/2000 Luciano et al.
6,033,307 A 3/2000 Vancura
6,047,963 A 4/2000 Pierce et al.
6,053,823 A 4/2000 Mathews

(56) References Cited

U.S. PATENT DOCUMENTS

| | | | |
|---|---|---|---|
| 6,056,642 | A | 5/2000 | Bennett |
| 6,059,289 | A | 5/2000 | Vancura |
| 6,059,658 | A | 5/2000 | Mangano et al. |
| 6,059,659 | A | 5/2000 | Busch et al. |
| 6,062,980 | A | 5/2000 | Luciano |
| 6,062,981 | A | 5/2000 | Luciano, Jr. |
| 6,071,192 | A | 6/2000 | Weiss |
| 6,083,105 | A | 7/2000 | Ronin et al. |
| 6,089,977 | A | 7/2000 | Bennett |
| 6,089,978 | A | 7/2000 | Adams |
| 6,089,980 | A | 7/2000 | Gauselmann |
| 6,093,101 | A | 7/2000 | Mourad |
| 6,093,102 | A | 7/2000 | Bennett |
| 6,098,985 | A | 8/2000 | Moody |
| 6,102,400 | A | 8/2000 | Scott et al. |
| 6,102,402 | A | 8/2000 | Scott et al. |
| 6,102,798 | A | 8/2000 | Bennett |
| 6,105,962 | A | 8/2000 | Malavazos et al. |
| 6,110,041 | A | 8/2000 | Walker et al. |
| 6,113,098 | A | 9/2000 | Adams |
| 6,120,031 | A | 9/2000 | Adams |
| 6,120,378 | A | 9/2000 | Moody et al. |
| 6,126,165 | A | 10/2000 | Sakamoto |
| 6,126,541 | A | 10/2000 | Fuchs |
| 6,126,542 | A | 10/2000 | Fier |
| 6,129,632 | A | 10/2000 | Luciano |
| 6,132,311 | A | 10/2000 | Williams |
| 6,135,884 | A | 10/2000 | Hedrick et al. |
| 6,142,872 | A | 11/2000 | Walker et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,186,894 | B1 | 2/2001 | Mayeroff |
| 6,190,254 | B1 | 2/2001 | Bennett |
| 6,190,255 | B1 | 2/2001 | Thomas et al. |
| 6,193,606 | B1 | 2/2001 | Walker et al. |
| 6,196,547 | B1 | 3/2001 | Pascal et al. |
| 6,203,009 | B1 | 3/2001 | Sines et al. |
| 6,203,429 | B1 | 3/2001 | Demar et al. |
| 6,209,869 | B1 | 4/2001 | Mathews |
| 6,210,277 | B1 | 4/2001 | Stefan |
| 6,217,022 | B1 | 4/2001 | Astaneha |
| 6,217,448 | B1 | 4/2001 | Olsen |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,542 | B1 | 5/2001 | Cosmi |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,264,200 | B1 | 7/2001 | Smith |
| 6,270,409 | B1 | 8/2001 | Shuster |
| 6,270,411 | B1 | 8/2001 | Gura et al. |
| 6,270,412 | B1 | 8/2001 | Crawford et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,302,791 | B1 | 10/2001 | Frohm et al. |
| 6,305,686 | B1 | 10/2001 | Perrie et al. |
| 6,309,299 | B1 | 10/2001 | Weiss |
| 6,311,976 | B1 | 11/2001 | Yoseloff et al. |
| 6,312,331 | B1 | 11/2001 | Tamaki |
| 6,312,334 | B1 | 11/2001 | Yoseloff |
| 6,315,660 | B1 | 11/2001 | DeMar et al. |
| 6,315,662 | B1 | 11/2001 | Jorasch et al. |
| 6,315,663 | B1 | 11/2001 | Sakamoto |
| 6,319,124 | B1 | 11/2001 | Baerlocher et al. |
| 6,322,078 | B1 | 11/2001 | Adams |
| 6,336,860 | B1 | 1/2002 | Webb |
| 6,336,862 | B1 | 1/2002 | Byrne |
| 6,336,863 | B1 | 1/2002 | Baerlocher et al. |
| 6,340,158 | B2 | 1/2002 | Pierce et al. |
| 6,352,260 | B1 | 3/2002 | Santiago |
| 6,358,144 | B1 | 3/2002 | Kadlic et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,364,768 | B1 | 4/2002 | Acres et al. |
| 6,368,214 | B1 | 4/2002 | Luciano |
| 6,371,853 | B1 | 4/2002 | Borta |
| 6,375,569 | B1 | 4/2002 | Acres |
| 6,375,570 | B1 | 4/2002 | Poole |
| 6,390,470 | B1 | 5/2002 | Huang |
| 6,394,902 | B1 | 5/2002 | Glavich et al. |
| 6,398,218 | B1 | 6/2002 | Vancura |
| 6,398,220 | B1 | 6/2002 | Inoue |
| 6,398,644 | B1 | 6/2002 | Perrie et al. |
| 6,413,162 | B1 | 7/2002 | Baerlocher et al. |
| 6,413,163 | B1 | 7/2002 | Yamauchi et al. |
| 6,419,579 | B1 | 7/2002 | Bennett |
| 6,428,412 | B1 | 8/2002 | Anderson et al. |
| 6,435,968 | B1 | 8/2002 | Torango |
| 6,439,943 | B1 | 8/2002 | Aoki et al. |
| 6,439,993 | B1 | 8/2002 | O'Halloran |
| 6,439,995 | B1 | 8/2002 | Hughs-Baird et al. |
| 6,443,452 | B1 | 9/2002 | Brune |
| 6,443,456 | B1 | 9/2002 | Gajor |
| 6,446,965 | B1 | 9/2002 | Boulton |
| 6,450,884 | B1 | 9/2002 | Seelig et al. |
| 6,454,266 | B1 | 9/2002 | Breeding et al. |
| 6,461,241 | B1 | 10/2002 | Webb et al. |
| 6,467,770 | B1 | 10/2002 | Matosevic |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,494,454 | B2 | 12/2002 | Adams |
| 6,497,409 | B2 | 12/2002 | Mathews |
| 6,517,432 | B1 | 2/2003 | Jaffe |
| 6,520,503 | B1 | 2/2003 | Porto |
| 6,520,854 | B1 | 2/2003 | McNally |
| 6,537,150 | B1 | 3/2003 | Luciano et al. |
| 6,537,152 | B2 | 3/2003 | Seelig et al. |
| 6,551,187 | B1 | 4/2003 | Jaffe |
| 6,561,512 | B2 | 5/2003 | Luciano et al. |
| 6,561,904 | B2 | 5/2003 | Locke et al. |
| 6,565,436 | B1 | 5/2003 | Baerlocher |
| 6,569,013 | B1 | 5/2003 | Taylor |
| 6,575,834 | B1 | 6/2003 | Lindo |
| 6,599,185 | B1 | 7/2003 | Kaminkow et al. |
| 6,599,193 | B2 | 7/2003 | Baerlocher et al. |
| 6,602,136 | B1 | 8/2003 | Baerlocher et al. |
| 6,602,137 | B2 | 8/2003 | Kaminkow et al. |
| 6,604,740 | B1 | 8/2003 | Singer et al. |
| 6,609,969 | B1 | 8/2003 | Luciano et al. |
| 6,609,970 | B1 | 8/2003 | Luciano, Jr. |
| 6,612,927 | B1 | 9/2003 | Slomiany et al. |
| 6,616,142 | B2 | 9/2003 | Adams |
| 6,632,139 | B1 | 10/2003 | Baerlocher |
| 6,632,140 | B2 | 10/2003 | Berman et al. |
| 6,634,942 | B2 | 10/2003 | Walker et al. |

(56) References Cited

U.S. PATENT DOCUMENTS 6,634,945 B2 10/2003 Glavich et al.
6,652,378 B2 11/2003 Cannon et al.
6,656,043 B2 12/2003 Seelig et al.
6,659,462 B1 12/2003 Scott
6,663,106 B1 12/2003 Cosmi
6,666,766 B2 12/2003 Baerlocher et al.
6,682,073 B2 1/2004 Bryant et al.
6,695,696 B1 2/2004 Kaminkow
6,712,693 B1 3/2004 Hettinger
6,712,694 B1 3/2004 Nordman
6,712,695 B2 3/2004 Mothwurf et al.
6,726,563 B1 4/2004 Baerlocher et al.
6,733,389 B2 5/2004 Webb et al.
6,739,970 B2 5/2004 Luciano
6,758,749 B2 7/2004 Krintzman
6,764,396 B2 7/2004 Seelig et al.
6,776,711 B1 8/2004 Baerlocher
6,780,105 B1 8/2004 Kaminkow
6,786,824 B2 9/2004 Cannon
6,802,778 B1 10/2004 Lemay et al.
6,805,349 B2 10/2004 Baerlocher et al.
6,811,483 B1 11/2004 Webb et al.
6,857,957 B2 2/2005 Marks et al.
6,869,359 B1 3/2005 Mathews
6,869,360 B2 3/2005 Marks et al.
6,878,061 B2 4/2005 Baerlocher et al.
6,884,167 B2 4/2005 Walker et al.
6,890,255 B2 5/2005 Jarvis et al.
6,890,257 B2 5/2005 Baerlocher
6,899,620 B2 5/2005 Kaminkow et al.
6,905,406 B2 6/2005 Kaminkow et al.
6,908,383 B2 6/2005 Baerlocher et al.
6,913,532 B2 7/2005 Baerlocher et al.
6,921,072 B2 7/2005 Hughes-Watts
6,921,335 B2 7/2005 Rodgers et al.
6,923,720 B2 8/2005 Loose
6,926,607 B2 8/2005 Slomiany et al.
6,929,952 B2 8/2005 Baerlocher
6,955,600 B2 10/2005 Glavich et al.
6,960,133 B1 11/2005 Marks et al.
6,988,731 B2 1/2006 Inoue
6,991,544 B2 1/2006 Soltys et al.
7,001,274 B2 2/2006 Baerlocher et al.
7,008,324 B1 3/2006 Johnson et al.
7,014,560 B2 3/2006 Glavich et al.
7,029,395 B1 4/2006 Baerlocher
7,052,395 B2 5/2006 Glavich et al.
7,066,814 B2 6/2006 Glavich et al.
7,094,150 B2 8/2006 Ungaro et al.
7,121,943 B2 10/2006 Webb et al.
7,169,044 B2 1/2007 Baerlocher et al.
7,204,488 B2 4/2007 Ilievski
RE39,659 E 5/2007 Luciano et al.
7,216,867 B1 5/2007 Luciano et al.
7,258,609 B2 8/2007 Nordman et al.
7,311,305 B2 12/2007 Matsuno et al.
2001/0003709 A1 6/2001 Adams
2001/0005690 A1 6/2001 Boulton
2001/0009865 A1 7/2001 Demar et al.
2001/0015525 A1 8/2001 Mathews
2001/0018361 A1 8/2001 Acres
2001/0022429 A1 9/2001 Luciano et al.
2001/0023199 A1 9/2001 Walker et al.
2001/0038178 A1 11/2001 Vancura
2002/0010014 A1 1/2002 Parra et al.
2002/0010017 A1 1/2002 Bennett
2002/0052233 A1 5/2002 Gauselmann
2002/0086725 A1 7/2002 Fasbender et al.
2002/0137559 A1 9/2002 Baerlocher
2002/0165023 A1 11/2002 Brosnan et al.
2002/0167126 A1 11/2002 Herman De Raedt et al.
2002/0169017 A1 11/2002 Visoenik
2002/0187827 A1 12/2002 Blankstein
2002/0193160 A1 12/2002 Tarantino
2003/0027623 A1 2/2003 Rose
2003/0050110 A1 3/2003 Wichinsky
2003/0054873 A1 3/2003 Peterson
2003/0060266 A1 3/2003 Baerlocher
2003/0060269 A1 3/2003 Paulsen et al.
2003/0060272 A1 3/2003 Glavich et al.
2003/0060281 A1 3/2003 Vancura
2003/0069062 A1 4/2003 Shimizu
2003/0069063 A1 4/2003 Bilyeu et al.
2003/0073483 A1 4/2003 Glavich et al.
2003/0092480 A1 5/2003 White et al.
2003/0092490 A1 5/2003 Gauselmann
2003/0094752 A1 5/2003 Mathews et al.
2003/0098543 A1 5/2003 Porto
2003/0153383 A1 8/2003 Baerlocher et al.
2003/0155708 A1 8/2003 Perrie et al.
2003/0162585 A1 8/2003 Bigelow et al.
2003/0195031 A1 10/2003 O'Donovan et al.
2003/0203753 A1 10/2003 Muir et al.
2003/0207713 A1 11/2003 Taylor
2003/0216165 A1 11/2003 Singer et al.
2003/0232651 A1 12/2003 Huard et al.
2004/0002372 A1 1/2004 Rodgers et al.
2004/0017043 A1 1/2004 Moody
2004/0038731 A1 2/2004 Englman
2004/0048646 A1* 3/2004 Visocnik ........................ 463/16
2004/0048650 A1 3/2004 Mierau et al.
2004/0048652 A1 3/2004 Ching et al.
2004/0053666 A1 3/2004 Vancura
2004/0053669 A1 3/2004 Gerrard et al.
2004/0053672 A1 3/2004 Baerlocher
2004/0061285 A1 4/2004 Hughes-Watts
2004/0063493 A1 4/2004 Baerlocher
2004/0072609 A1 4/2004 Ungaro et al.
2004/0072612 A1 4/2004 Rodgers et al.
2004/0077398 A1 4/2004 Jarvis et al.
2004/0102244 A1 5/2004 Kryuchkov et al.
2004/0116177 A1 6/2004 Frost et al.
2004/0137982 A1 7/2004 Cuddy et al.
2004/0147306 A1 7/2004 Randall et al.
2004/0152500 A1 8/2004 Baerlocher
2004/0159590 A1 8/2004 Mothwurf
2004/0162129 A1 8/2004 Nelson
2004/0162130 A1 8/2004 Walker et al.
2004/0176156 A1 9/2004 Walker et al.
2004/0212150 A1 10/2004 Huard et al.
2004/0219969 A1 11/2004 Casey et al.
2004/0242302 A1 12/2004 Baerlocher
2004/0242315 A1 12/2004 Paulsen et al.
2004/0251624 A1 12/2004 Hodapp et al.
2004/0254011 A1 12/2004 Muskin
2004/0256804 A1 12/2004 Huard et al.
2004/0266510 A1 12/2004 Kojima
2004/0266512 A1 12/2004 Kaminkow
2004/0266516 A1 12/2004 Thomas
2004/0266517 A1 12/2004 Bleich et al.
2005/0014550 A1 1/2005 Rhoten
2005/0020346 A1 1/2005 Baerlocher
2005/0029745 A1 2/2005 Walker et al.
2005/0037838 A1 2/2005 Dunaevsky et al.
2005/0049035 A1 3/2005 Baerlocher et al.
2005/0054429 A1 3/2005 Baerlocher et al.
2005/0059481 A1 3/2005 Joshi et al.
2005/0060050 A1 3/2005 Baerlocher
2005/0070354 A1 3/2005 Baerlocher et al.
2005/0075163 A1 4/2005 Cuddy et al.
2005/0079911 A1 4/2005 Nakatsu
2005/0090306 A1 4/2005 Seelig et al.
2005/0130737 A1 6/2005 Englman et al.
2005/0176494 A1 8/2005 Thomas
2005/0192076 A1 9/2005 Lowery
2005/0192079 A1 9/2005 Lowery
2005/0215307 A1 9/2005 Jarvis et al.
2005/0215311 A1 9/2005 Hornik et al.
2005/0218590 A1 10/2005 O'Halloran et al.
2005/0233796 A1 10/2005 Baerlocher et al.
2005/0233801 A1 10/2005 Baerlocher et al.
2005/0233803 A1 10/2005 Yang
2005/0255904 A1 11/2005 Duhamel
2005/0282615 A1 12/2005 Englman et al.

(56) References Cited

U.S. PATENT DOCUMENTS

| | | | | |
|---|---|---|---|---|
| 2005/0282629 | A1 | 12/2005 | Gagner | |
| 2005/0285336 | A1 | 12/2005 | Ilievski | |
| 2005/0285337 | A1 | 12/2005 | Durham et al. | |
| 2006/0003834 | A1 | 1/2006 | Okada | |
| 2006/0009283 | A1 | 1/2006 | Englman et al. | |
| 2006/0009286 | A1 | 1/2006 | Durham et al. | |
| 2006/0014580 | A1 | 1/2006 | Hawthorn | |
| 2006/0019744 | A1 | 1/2006 | Roemer | |
| 2006/0025193 | A1 | 2/2006 | Gail et al. | |
| 2006/0025211 | A1 | 2/2006 | Wilday et al. | |
| 2006/0046833 | A1 | 3/2006 | Hatakeyama et al. | |
| 2006/0066044 | A1 | 3/2006 | Dabosh | |
| 2006/0069619 | A1 | 3/2006 | Walker et al. | |
| 2006/0073873 | A1 | 4/2006 | Rodgers et al. | |
| 2006/0073897 | A1 | 4/2006 | Englman et al. | |
| 2006/0094495 | A1 | 5/2006 | Gelber et al. | |
| 2006/0157927 | A1 | 7/2006 | O'Halloran et al. | |
| 2006/0157928 | A1 | 7/2006 | O'Halloran | |
| 2006/0170154 | A1 | 8/2006 | Matsuno et al. | |
| 2006/0170155 | A1 | 8/2006 | Silverman | |
| 2006/0178191 | A1 | 8/2006 | Ellis | |
| 2006/0205480 | A1 | 9/2006 | Glavich et al. | |
| 2006/0217174 | A1 | 9/2006 | Walker et al. | |
| 2006/0237905 | A1 | 10/2006 | Nicely et al. | |
| 2006/0246989 | A1 | 11/2006 | Glavich et al. | |
| 2006/0249899 | A1 | 11/2006 | Lease | |
| 2006/0287034 | A1 | 12/2006 | Englman et al. | |
| 2006/0287053 | A1 | 12/2006 | Yokota | |
| 2007/0021182 | A1 | 1/2007 | Gauselmann | |
| 2007/0057452 | A1 | 3/2007 | Dargue | |
| 2007/0060247 | A1 | 3/2007 | Low et al. | |
| 2007/0060262 | A1 | 3/2007 | Kosaka et al. | |
| 2007/0060292 | A1 | 3/2007 | Peterson | |
| 2007/0069459 | A1 | 3/2007 | Vidondo | |
| 2007/0075488 | A1 | 4/2007 | Pececnik | |
| 2007/0135203 | A1 | 6/2007 | Nicely | |
| 2007/0202948 | A1* | 8/2007 | Muir et al. | 463/31 |
| 2007/0096645 | A1 | 4/2008 | Frerking et al. | |
| 2013/0102372 | A1* | 4/2013 | Lutnick et al. | 463/13 |

FOREIGN PATENT DOCUMENTS

| | | |
|---|---|---|
| AU | 199717601 | 9/1997 |
| AU | 199917318 | 9/1999 |
| AU | 200245837 | 12/2002 |
| DE | 3105266 | 9/1982 |
| DE | 3 233 405 | 3/1984 |
| DE | 3716849 | 12/1988 |
| DE | 19613455 | 8/1997 |
| DE | 19936196 | 1/2001 |
| EP | 60 019 | 9/1982 |
| EP | 0 558 307 | 2/1993 |
| EP | 0 753 331 | 1/1997 |
| EP | 0 874 337 | 10/1998 |
| EP | 0 926 645 | 6/1999 |
| EP | 0 945 837 | 9/1999 |
| EP | 0 981 119 | 2/2000 |
| EP | 0 984 407 | 3/2000 |
| EP | 0 984 408 | 3/2000 |
| EP | 0 989 531 | 3/2000 |
| EP | 1 076 321 | 2/2001 |
| EP | 1 195 730 | 4/2002 |
| EP | 1 226 851 | 7/2002 |
| EP | 1 536 388 | 1/2005 |
| EP | 1 513 114 | 3/2005 |
| EP | 1 513 116 | 3/2005 |
| EP | 1 513 117 | 3/2005 |
| EP | 1 580 701 | 3/2005 |
| EP | 1 589 501 | 10/2005 |
| EP | 1 671 684 | 6/2006 |
| EP | 1 710 000 | 10/2006 |
| EP | 1 721 642 | 11/2006 |
| EP | 1 736 215 | 12/2006 |
| EP | 1 769 828 | 4/2007 |
| GB | 970806 | 9/1964 |
| GB | 2 101 380 | 1/1983 |
| GB | 2 137 392 | 10/1984 |
| GB | 2 262 642 | 6/1993 |
| GB | 2 292 245 | 2/1996 |
| GB | 2 322 217 | 8/1998 |
| GB | 2 354 179 | 3/2001 |
| GB | 2358591 | 8/2001 |
| GB | 2 371 494 | 7/2002 |
| GB | 2 382 911 | 6/2003 |
| GB | 2 387 950 | 10/2003 |
| GB | 2 431 362 | 4/2007 |
| WO | WO 85/00910 | 2/1985 |
| WO | WO 95/20944 | 11/1995 |
| WO | WO 97/32285 | 9/1997 |
| WO | WO 9738766 | 10/1997 |
| WO | WO 98/00207 | 1/1998 |
| WO | WO 99/03078 | 1/1999 |
| WO | WO 00/32286 | 6/2000 |
| WO | WO 00/33269 | 6/2000 |
| WO | WO 00/66235 | 11/2000 |
| WO | WO 00/76606 | 12/2000 |
| WO | WO 01/26019 | 4/2001 |
| WO | WO 01/86604 | 11/2001 |
| WO | WO 02/056984 | 7/2002 |
| WO | WO 02/078804 | 10/2002 |
| WO | WO 03/026757 | 4/2003 |
| WO | WO 2004/023400 | 3/2004 |
| WO | WO 2004/025584 | 3/2004 |
| WO | WO 2005/077480 | 8/2005 |
| WO | WO 2005/083599 | 9/2005 |
| WO | WO 2006/015442 | 2/2006 |
| WO | WO 2006/017431 | 2/2006 |
| WO | WO 2006/061616 | 6/2006 |
| WO | WO 2006/078219 | 7/2006 |
| WO | WO 2006/094398 | 9/2006 |
| WO | WO 2006/097007 | 9/2006 |
| WO | WO 2007/024202 | 3/2007 |
| WO | WO 2007/033430 | 3/2007 |
| WO | WO 2007/077449 | 7/2007 |
| WO | WO 2007/080421 | 7/2007 |

OTHER PUBLICATIONS

3RV—Jackpot Party Advertisement written by WMS Gaming, Inc., published Aug. 8, 2002.

alfastreet D8 description, Alfa street Gaming Instruments, available on or before Nov. 13, 2006.

alfastreet M8 description, Alfa street Gaming Instruments, available on or before Nov. 13, 2006.

American Bandstand Brochure written by Anchor Games, published in 2001.

Animator, [online] [printed on Nov. 8, 2006]. Retrieved from the Internet at <URL: http://www.tcsjohnhuxley.com.au/products/displays/animator.htm>.

Big Times Red, White & Blue Advertisement written by IGT published in 2005.

Black Swan Paytable Display written by IGT, published prior to 2001.

Blurring the Green-Felt Line, written by International Gaming & Wagering Business, published in Jan. 2003.

Bonus Games Advertisement written by IGT, published in 1999.

Bonus Roulette Brochure written by R. Franco, available on or before Nov. 13, 2006.

Boot Scootin Article written by Strictly Slots/Aristocrat Leisure Industries, PTY Ltd., published prior to Jul. 2002.

Break the Spell Advertisement written by Atronic Casino Technology, Ltd., published in 1999.

Break the Spell Article written by Strictly Slots/Atronic Casino Technology, Ltd., published in Sep. 2000.

Break the Spell Atronic Web Page, published in Jan. 2001.

Buck's Roulette Brochure written by R. Franco, available on or before Nov. 13, 2006.

Bunco History and Rules, printed from http://world-bunco.com/history.html on May 22, 2000.

(56) References Cited

OTHER PUBLICATIONS

Cash Chameleon Article written by Strictly Slots/Aristocrat Leisure Industries, PTY Ltd., published in Apr. 2001.
Catch A Wave Advertisement written by IGT, published in Dec. 2000.
Classic Pot of Gold Brochure written by Ace Coin Equipment Ltd., available on or before Nov. 13, 2006.
Cossack Dancer Advertisement written by Olympic Video Gaming, published prior to 2002.
Creepy and Kooky written by Frank Legato, published by Strictly Slots in Jul. 2000, pp. 52-54.
Cyberdyne Gaming Brochure written by Cyberdyne Gaming, available on or before Nov. 13, 2006.
Description of Symbol Feature in Australian UFO Gaming Machine written by Barcrest Ltd., published in 1995.
Dolphin Treasure Advertisement written by Aristocrat Leisure Industries Pty., Ltd., published in 1996.
Double Diamond Line Advertisement written by Bally Gaming Systems, published in 2000.
Double Roulette Wheel Excerpt, Loose Change Magazine, Oct. 1993, p. 26.
e-FX Roulette Display, [online] [printed on Nov. 8, 2006]. Retrieved from the Internet at <URL: file://C:\DOCUME~1\rys\LOCALS~1\Temp\S4M2B8E0.htm>.
Elvis Brochure written by IGT, published in 1999.
Elvis Hits Advertisement written by IGT, published in 1999.
Enchanted Forest™ Gaming Description from Aristocrat, available in 1994.
Enchanted Unicorn Advertisement written by IGT, published in 2001.
European Search report from EP Patent Application EP 03 813 403.7 dated Apr. 5, 2007.
Family Feud Bullseye advertisement, printed from www.igtonline.com/megajackpots/new__games/family__feud__bullseye__slots.html on Mar. 2, 2005 and available in 2003.
Fey, Marshall, Slot Machines: A Pictorial History of the First 100 Years, 5th Edition, Copyright 1997, pp. 17, 19, 31, 32, 38, 68, 70, 77, 78, 79, 85, 87, 92, 93, 96, and 159 (17 pages).
Field Testing New Slots Article, written by Strictly Slots, published in Jul. 2000.
Fishin' Buddies Article published in Strictly Siots/Anchor Games, published in Apr. 2001.
Frog Prince article written by International Game Technology, published in 2001.
Fully Automated Wheel, [oneline] [printed on Nov. 1, 2006]. Retrieved from the Internet at <URL:http://www.nrcgamingsystems.com/our__products.asp>.
Happy Camper Advertisement written by IGT, published in 2001.
International Search Report in European Application EP 07120368, Mailed Jun. 11, 2008.
Introducing the "Smiling Ape" Machine Advertisement (including Joker's Wild Poker description) written by IGT, published prior to 2001.
Jackpot Party Advertisement on website page http://www.wmsgaming.com/products/slot/jpp/index.html, printed on Mar. 21, 2001.
Jackpot Party Brochures and Articles written by WMS Gaming, Inc., published in Mar. 1998.
Jackpot Party Video 9-Line Advertisement written by WMS Gaming, Inc., available prior to Feb. 23, 2004.
Jeopardy Advertisement written by IGT, published in 2000.
Jeopardy Video Slots advertisement written by IGT, published in 2000.
Jeopardy, MegaJackpots Advertisement written by IGT, published in 1998.
Joker's Wild Advertisement written by IGT, published prior to 2001.
Little Devils Brochure, written by IGT, published in 1998.
Little Green Men, Jr. Advertisement written by A.C. Coin and Slot Services Company, published prior to 2002.
Live Random Dice Machines, written by General Automatic Amusement, available on or before Nov. 13, 2006.
Loco Loot Article written by Strictly Slots/Aristocrat Leisure Industries, PTY Ltd., published in May 2002.
Lucky Dolls, written by Strictly Slots, published in May 2002.
LuminAR (Illuminated Roulette), [online] [printed on Oct. 31, 2006]. Retrieved from the Internet at <URL:http://www.tcsjohnhuxley.com.au/products/roulette/luminar.htm>.
Mark VII Wheel, [online] [printed on Oct. 31, 2006]. Retrieved from the Internet at <URL:http://www.tcsjohnhuxley.com.au/products/roulette/roulettewheels/markvii.htm>.
Mauritian Roulette from Ultimate Success Gaming, [online] [printed on Oct. 31, 2006]. Retrieved from the Internet at <URL:http://www.gamingfloor.com/features/usg/MagicR.htm>.
Megastar Family description, Aristocrat Technologies, Inc., available on or before Feb. 23, 2004.
Mistress of the Dark™ Advertisement written by IGT, published in 2002.
Monopoly Blackjack Edition Game described in Mikohn brochure, published in 2000.
Monte Carlo advertisement, written by Bally Gaming, Inc., published in 2002.
Mountain Money Article written by Strictly Slots/Aristocrat Leisure Industries, PTY Ltd., published in Jun. 2002.
Multi-Action Blackjack brochure, http://conjelco.com/faq/bj.html from Apr. 25, 2001, printed on Jul. 30, 2001.
Multi-Play Poker by Bally Gaming, described in Strictly Slots, published in Dec. 2000.
Multi-Play Poker by Bally Gaming, printed from ballygaming.com/products/multi-play-poker.html on Apr. 25, 2001.
Odds on Gaming™, Inc. brochure, published by Odds on Gaming, available on or before Nov. 13, 2006.
On the House Advertisement written by Olympic Video Gaming, published prior to 2002.
Penguin Pays Advertisement written by Aristocrat Incorporated, published in 1998.
Pick a Prize Brochure written by Acres Gaming Incorporated, published prior to 2001, in or before December thereof.
Pick a Prize Brochure written by Acres Gaming Incorporated, published prior 2001.
Play It Again Poker Brochure, written by IGT, published in 1999.
Power Slotto Brochure published by AC Coin & Slot in or before Dec. 2002.
R&B™ Brochure published by AC Coin & Slot, available on or before Nov. 13, 2006.
Rapid Roulette™ written by John Huxley Ltd., published in 2002.
REEL Magic™ Gaming Machine Description written by IGT, available in 1986.
Roulette Grand Jeu brochure, written by Amatic Industries, available on or before Nov. 13, 2006.
Roulette Wheel Analysis, [online] [printed on Oct. 31, 2006]. Retrieved from the Internet at <URL:http://www.tcsjohnhuxley.com.au/products/roulette/roulettewheelanalysis.htm>.
Roulette Wheels catalog, published by Gaming Partners International SAS, available prior to Nov. 10, 2006.
Roulette written by Atronic Casino Technology, published in 1999.
Royal Roulette advertisement written by Barcrest Games, available on or before Nov. 13, 2006.
Royal Roulette Brochure written by Impulse Gaming Ltd., available on or before Nov. 13, 2006.
Saturn Data Logger, [online] [printed on Oct. 31, 2006]. Retrieved from the Internet at <URL:http://www.tcsjohnhuxley.com.au/products/roulette/santurndatalogger.htm>.
Saturn Wheel, [online] [printed on Oct. 31, 2006]. Retrieved from the Internet at <URL: http://www.tcsjohnhuxley.com.au/products/roulettewheels/saturn.htm>.
Silver City Roundup Brochure published by AC Coin & Slot, available on or before Nov. 13, 2006.
Slot Machine Buyer's Handbook, A Consumer's Guide to Slot Machines written by David L. Saul and Daniel R. Mead, published in 1998.
Slot Machines and Coin-Op Games written by Bill Kurtz, published in 1997.
Slot Machines on Parade, 1st edition written by Robert N. Geddes and illustrated by Daniel R. Mead, published in 1980.

(56) References Cited

OTHER PUBLICATIONS

Slot Machines written by Marshall Fey, published in 1983, 1989, 1991, 1994, 1997.
Slot Machines, A Pictorial History of the First 100 Years, written by Marshall Fey, published by Liberty Belle Books, 1983 1989, 1991, 1994, 1997.
Slotopoly Brochure, written by IGT, published in 1998.
Slots 2003 Article written by Melissa Raimondi, published in Jan. 2003.
Spin Til You Win Game Description written by IGT, published in 1996.
Starburst Wheel, [online] [printed on Oct. 31, 2006]. Retrieved from the Internet at <URL:http://www.tcsjohnhuxley.com.au/products/roulette/roulettewheels/starburst.htm>.
Super Bonus Poker by Bally Gaming, described in Strictly Slots, published in Apr. 2000.
Super Times Pay Poker Advertisement, written by IGT, published in 2003.
Sure to Beat the Bank, article located on the web at http://query.nytimes.com/mem/archive-free/pdf?r=1&res=9501E3DB1E3EEF33A25755C2A9679C94679FD7CF&oref=slogin, The New York Times, published Jan. 1886.
Take Your Pick Article written by Strictly Slots, published in Mar. 2001.
Technique of Victory, written by Odrex, available on or before Nov. 13, 2006.
The Basics of Winning Video Poker (Chapter VI Deuces Wild & Chapter VII Jokers Wild) written by J. Edward Allen, published in 1990.
The Latest Buzz Article written by Bally Gaming Systems, published in Fall 2000.
Top Dollar Brochure, written by IGT, published in 1998.
Totem Pole Advertisement, written by IGT, published in 1997, in or before Dec. thereof.
Tropical Fever Glass, written by IGT, published prior to Apr. 2001.
TURBOREEL by Barcrest (with English Translation), available in 2005.
We Make Gaming Fun! Advertisement written by WMS Gaming Inc., available prior to Feb. 23, 2004.
Wheel of Fortune Special Edition Classic Spin Video Slots, written by IGT, published before Sep. 30, 2004.
Wheel of Fortune Video advertisement, published by IGT in 1999.
Wheel of Fortune Video Slots advertisement, published by IGT in 2002.
Wheel of Madness Game, described in AC Coin & Slot brochure, published in 2000.
Wheel Spins Bonus (Video Wheel of Fortune) article written by IGT, published before Sep. 30, 2004.
Wild Bear Salmon Run Advertisement written by IGT, published in 2003.
Wild Streak Advertisement written by WMS Gaming, Inc., published in Strictly Slots Mar. 2001.
Winning Streak Brochure, written by Aristocrat, published in 1994.
Your Real Key to Gaming Success Advertisement (including Roll Over Beethoven and Wild Fortune) written by Olympic Video Gaming, published prior to Feb. 23, 2004.

* cited by examiner

MULTIPLE REEL ROULETTE GAME

PRIORITY CLAIM

This application is a continuation of, and claims priority to and the benefit of, U.S. patent application Ser. No. 12/979,050, filed on Dec. 27, 2010, which is a continuation of, and claims priority to and the benefit of, U.S. patent application Ser. No. 12/391,833, filed on Feb. 24, 2009, which issued as U.S. Pat. No. 7,901,280 on Mar. 8, 2011, which is a continuation of, and claims priority to and the benefit of, U.S. patent application Ser. No. 11/119,997, filed on May 2, 2005, which issued as U.S. Pat. No. 7,553,233 on Jun. 30, 2009, which is a continuation of, and claims priority to and the benefit of, U.S. patent application Ser. No. 10/319,774, filed on Dec. 13, 2002, which issued as U.S. Pat. No. 6,890,255 on May 10, 2005, which claims priority to and the benefit of U.S. Provisional Patent Application No. 60/341,548, filed on Dec. 17, 2001, the entire contents of each of which are incorporated herein by reference.

FIELD OF THE INVENTION

This invention relates generally to a game, and more particularly to an electronic game that simulates the game of roulette, and still more particular to an electronic roulette game that provides a player the opportunity to play multiple roulette wheels simultaneously, make the same betting choice for all wheels and/or select multiple winning numbers for each wheel.

BACKGROUND OF THE INVENTION

Roulette is a game of chance that has been played, it is believed, in various forms since the $18^{th}$ century. Traditional roulette is played in casinos on a table, wherein the wheel is set near the middle of the table. The outer wheel area is divided into 37 spaces in Europe and 38 spaces in the United States. Each space has outer walls defining sectors, so that the ball can come to rest within a sector after the wheel stops spinning. The sectors alternate between the color red and the color black and are numbered from 1 to 36. There is also a 0 (green or white) and a 00 (in the United States version).

The table includes a roulette betting felt configuration for making betting selections which has, among other things, numbered red and black squares corresponding to the wheel for placing bets on the outcome of the resting place of the ball after the wheel stops spinning. A "winning number" is the outcome of the roulette wheel in the form of one of the numbers selected by the roulette wheel—regardless of whether it matches the player's wager. A "winning bet" occurs when the player's selection (or bet) includes a "winning number".

As indicated above, certain of the numbers and spaces on the roulette betting felt (such as 2, 4, 6, 8, 10, 11, 13, 15, 17, 20, 22, 24, 26, 28, 29, 31, 33, and 35) are colored black, while others (such as 1, 3, 5, 7, 9, 12, 14, 16, 18, 19, 21, 23, 25, 27, 32, 34 and 36) are colored red. Also included on the betting felt are spaces for such bets as: "manqué" (1 to 18 inclusive): "passé" (19 to 36 inclusive); "pair" (an even number); "impair" (an odd number); "rouge" (a red number); and "noir" (a black number). Therefore, the winning bet may be comprised of a bet on the particular winning number, a bet on a range of numbers that includes the winning number (e.g., on odd or the "$2^{nd}$ 12"), or a bet on a color that includes a winning number.

All bets are placed against the house and are indicated by placing stakes (e.g., chips) on the particular numbers or types of bets selected as they appear on the table. Once the bets are placed, the "croupier" spins the wheel in one direction and tosses the ball onto the wheel in the other direction. The sector where the ball finally comes to rest is the outcome, thereby indicating the winning number and color. This information is then used to manually determine which of the bets are winning bets. Various betting combinations with different odds and maximum bets are allowed depending on the rules of the gaming establishment. The standard odds and payouts for traditional roulette are well known in the art.

While roulette may be played in, among other places, most casinos, traditional versions of roulette are somewhat slow moving and hence can be lacking in player interest. Several prior art games have attempted to provide interesting variations on conventional roulette.

U.S. Pat. No. 6,209,869 to Mathews discloses an apparatus and method for playing a roulette-type game. The apparatus includes a conventional roulette wheel and four tables. Each table has a lower playing field and an upper playing field, wherein each field is utilized for placing bets. During play, four balls are utilized on the one wheel, wherein each ball corresponds to one of the tables. The lower field is utilized for placing bets on the single ball that is associated with that particular table, while the upper field of each table is utilized for placing bets on all of the balls in play.

U.S. Pat. No. 5,259,616 to Bergmann discloses a coin-operated gaming machine that has a roulette-like number pan and a setting keyboard. In operation, the player inserts one or more coins into a coin insertion slot. The player then selects which numbers the player wishes to bet on using the keyboard. After the player places a bet, a random number generator randomly determines the winning number, and that number is then highlighted on the number pan. The random number generator also randomly determines a win multiplier number by which the winning payout is multiplied.

U.S. Pat. No. 6,083,105 to Ronin et al. discloses a single-player computerized roulette playing apparatus. The apparatus includes a rotatable roulette wheel that is mechanically rotated using a drive mechanism. One or more balls are put into play during the game. A roulette game field is displayed on a corresponding computer display, which provides a means by which the player can place one or more bets.

U.S. Pat. No. 5,755,440 to Sher relates to an apparatus used to play roulette using multiple balls. The apparatus includes a single roulette wheel that has multiple tracks, thereby permitting two or more balls to be propelled into the wheel simultaneously.

Additionally, video slots and poker games have provided jackpots comprising larger than normal payoffs and/or progressive payoffs, which are based on the performance of more than one machine which can be linked together—in an attempt to generate more interest and a perception of greater rewards. However, these previously devised games do not provide the ability to play a great number of games in a short amount of time—something that is increasingly important in a casino environment.

Indeed, there is a constant need in the gaming industry to devise new games that keep players interested to substantially reduce the possibility that players will cease playing or reduce the amount that they play due to a perceived lack of interest or challenge. Moreover, it is desirable to provide new or different variations of existing, familiar games so as to overcome any reluctance to play and possibly lose at games with unfamiliar rules or strategies.

Therefore, it is an object of the present invention to provide an electronic game that captures the excitement of casino-style roulette, while providing the opportunity to bet on multiple wheels simultaneously and/or provide multiple winning numbers for each roulette wheel displayed.

It is a second object of the present invention to provide a roulette-type game that provides progressive or high jackpot betting opportunities so as to provide maximum interest to roulette or other wagering game players.

It is a further object of the present invention to provide a roulette game that can be played in the form of a video slot machine in order to conserve valuable casino floor space, and minimize game acquisition and operating costs.

It is another object of the present invention to provide a roulette game that automatically determines which wagers are winning bets and recalculates a player's remaining credits based on the outcome so as to minimize the calculations which must be performed by the player, and minimize the use of casino employees.

It is yet another object of the present invention to provide a roulette-based game that can be implemented on a video gaming machine in a casino for gambling purposes.

A still further object of the present invention is to provide an electronic roulette-based game that is easy and economical to manufacture.

SUMMARY OF THE INVENTION

The above and other objects, features and advantages of the invention will become readily apparent from the following detailed description thereof, which is to be read in connection with the accompanying drawings.

The above-listed objects are met or exceeded by the present electronic game wherein an electronic video roulette game is provided having at least two wheels having multiple numbers for providing an outcome. The electronic game may be played by at least one player who makes at least one selection or bet and seeks a payout when the selection includes a winning number. In order to provide visual stimulation and to emphasize the random nature of the number generation, the wheels are spun or made to appear to spin during the process of randomly picking the winning numbers.

The game comprises: a video or electronic display for displaying the video game; an input means, such as a touch screen, roller ball, touch pad, mouse, push buttons, or the like, operably associated with the electronic display for entering the individual number or other betting selections by the player; a microprocessor for controlling the game; means for randomly generating the outcome of the at least two roulette wheels; at least one indicator (e.g.; a pay line) to show the outcome of the roulette wheels; and, means for computing the payout based on the outcome. The electronic display may include a roulette betting felt layout for making the betting selections.

The game can further include multiple winning numbers per roulette wheel and/or means for wagering on the roulette wheels. Using either multiple wheels and/or multiple winning numbers per wheel results in multiple winning numbers and, depending on the bets which were placed, possibly multiple winning bets. The wagering means can further include means for wagering on multiple roulette wheels by making a single betting selection.

The game may also feature a bonus, jackpot, progressive, or other special payout that may be awarded when the outcome includes a particular winning number or a winning number that is repeated a selected number of times on different wheels. For example, a special payout could be made if the same number appeared three times on five roulette wheels. The special payout could be further constrained to three adjacent wheels having the same number, or perhaps only the first three wheels. By making it practical for a player to play one or more roulette games simultaneously, the invention allows the creation of these special wheel combination payouts.

Unlike such conventional, mechanical-type roulette wheels, the present invention allows roulette to be played in a much smaller space. In fact, it enables the game to be played in the form of a standard slot machine. Moreover, with the present invention, the player can play many wheels at once—unlike conventional roulette games where at most it is feasible to play one or two roulette wheels at the same time. The present invention is also much more likely to be lower in cost and maintenance when compared with roulette games that depend on mechanical wheels.

A method is also provided for playing roulette on one or more roulette wheels having numbers for producing an outcome, wherein the method comprises the steps of: selecting the roulette number or combination of numbers to be played (e.g., the first twelve numbers or all black numbers); selecting the number of roulette wheels to be played; selecting the number of winning numbers per wheel; wagering on the selections; determining the outcome of the roulette wheels; and computing the amount of the payout based on the outcome.

Wagering is made on multiple roulette wheels by placing a single wager. The player chooses the wager amount, the number of wheels to play and the number of winning numbers per wheel. Hence, the number of wheels being played and the number of winning numbers per wheel multiplies the amount wagered. For example, if five wheels are played (each having two winning numbers per wheel), a total of ten winning numbers are chosen each game, with the player betting ten times the wager on each roulette game. As a result, the game is fast moving for the player and generates greater revenue for the casino, as compared to traditional roulette.

In play, the wheels are spun and, when the winning number (s) is decided for each wheel, the wagers are settled between the house and player. The wheels can be represented on the electronic or video screen as traditional looking roulette wheels or as any other numerical representation of the random choice of thirty-eight numbers in the case of a United States wheel and thirty-seven numbers in the case of a European wheel. A bonus payout may be provided when the outcome includes a number selection which is repeated a selected number of times as a winning number and winning bet.

The preferred embodiment utilizes video slot machine wheels or reels to represent at least two roulette wheels wherein each wheel has the thirty-seven or thirty-eight number positions of a traditional roulette wheel. In operation, the wheels are spun and the winning numbers are determined by the roulette numbers that stop at the indicator or pay line position designated on the video slot machine wheel. By activating multiple pay lines, multiple winning numbers can be chosen on each video roulette wheel. Another embodiment of the invention utilizes electromechanical slot machine wheels as a roulette wheel analog that would operate the same as the video slot machine wheels in the preferred embodiment.

As indicated above, the roulette wheels also can be represented by graphic representations of roulette wheels having multiple numbered slots on a video or electronic screen, wherein the winning number is indicated by the representation of a ball landing in the slot of the winning number. More than one winning number per roulette wheel is indicated by the representation of multiple balls falling into a number of winning number slots.

Thus, this invention brings the excitement of traditional roulette to an electronic video game. Moreover, excitement to the player and revenue generation to the gaming establishment are increased because the player can play multiple wheels simultaneously, with a single betting choice being used for all the wheels being played. Moreover, multiple winning numbers per wheel can be used. Accordingly, the amount wagered is multiplied by the number of wheels that are in play, as well as the number of winning numbers per wheel.

Additional features and advantages of the present invention are described in, and will be apparent from, the following Detailed Description of the Invention and the figures.

DETAILED DESCRIPTION OF THE INVENTION

Figure 1:
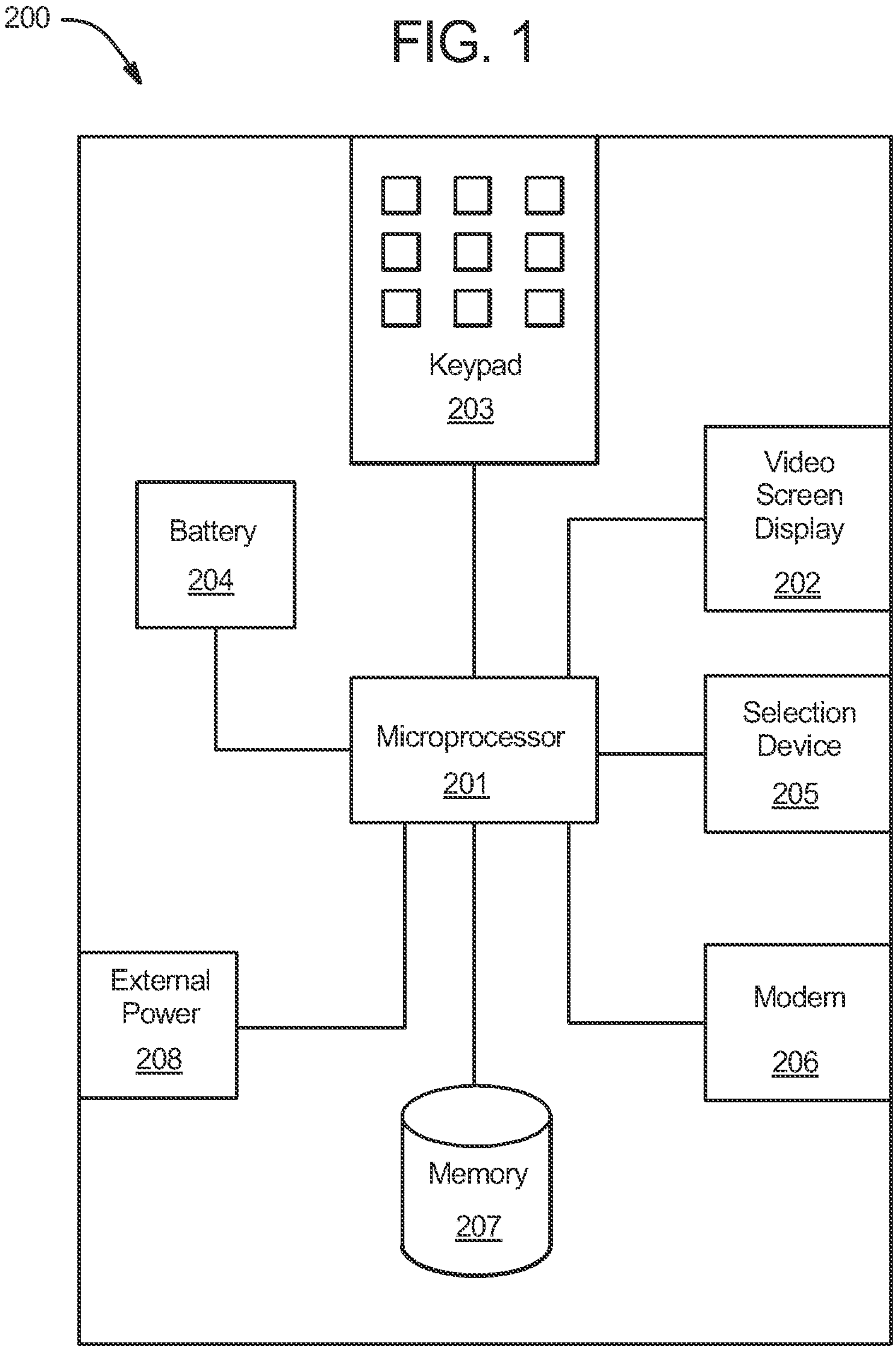
FIG. 1 is a schematic diagram of a computing device of the present invention.

While this invention is susceptible of embodiment in many different forms, there is shown in the drawings and will herein be described in detail, one or more specific embodiments with the understanding that the present disclosure is to be considered merely an exemplification of the principles of the invention and the application is limited only to the appended claims.

Referring to the drawings in detail, and initially to FIG. 1 thereof, a gaming device 200 according to a first embodiment of the present invention is shown. While the game of the present invention can be played on any electronic computing device, it is preferably played in a casino as a video gaming machine for gambling purposes. Alternatively, it can be played on a computer as an on-line gambling game over the Internet as part of a Wide Area Network ("WAN"), as part of a Local Area Network ("LAN"), and/or on a stand-alone computer.

It is also appreciated that another embodiment of the present invention involves using multiple concentric table-top roulette wheels. In this embodiment, a player may place a bet that covers one of the individual roulette wheels or all of the roulette wheels. It is further appreciated that multiple balls may be used on each roulette wheel, thereby increasing the number of winning numbers available per roulette wheel. Thus, the level of excitement is substantially increased from the standard roulette game.

FIG. 1 is a schematic diagram of a computing or gaming device 200 with which the present game is implemented. The gaming device 200 includes a microprocessor 201 for executing one or more programs stored in the device's memory 207, a video or electronic screen display 202, a selection device 205 for providing a means by which the player interacts with the gaming device 200, and an external power supply 208 and/or a battery 204 in electrical communication with each of the above-noted components for providing electrical power thereto. The memory 207, electronic screen display 202, and selection device 205 are each in communication with the microprocessor 201.

The selection device 205 may include but is not limited to a keypad, a peripheral device such as an external keyboard or mouse, and/or a plurality of function specific buttons. In the preferred embodiment, the electronic display screen 202 is a touch screen that serves as both the selection device 205 and the electronic screen display 202. In this embodiment, the selection device 205 includes "interactive" icons that appear on the electronic screen display 202. When the player touches the electronic screen display 202 at the location where an "interactive" icon of the type generally known in the prior art is displayed, this has the same effect as if the player were pushing a conventional electromechanical keypad button. Gaming device 200 can also include a credit card terminal, card reader or other such device for receiving payment, charging the player or tracking the player's gaming activity.

In the preferred embodiment, as shown in FIGS. 3 through 9, the roulette wheels are represented by a graphical representation of a series of slot machine wheels. As explained in more detail below, this embodiment may also include multiple pay lines to indicate the winning numbers and to modify the odds of winning. Alternatively, graphical representations of roulette wheels can be used. Likewise, electromechanical slot machine reels can also be used to represent and randomly select the winning numbers. Slot machine slots can also be used to signify the winning numbers.

Figure 2:
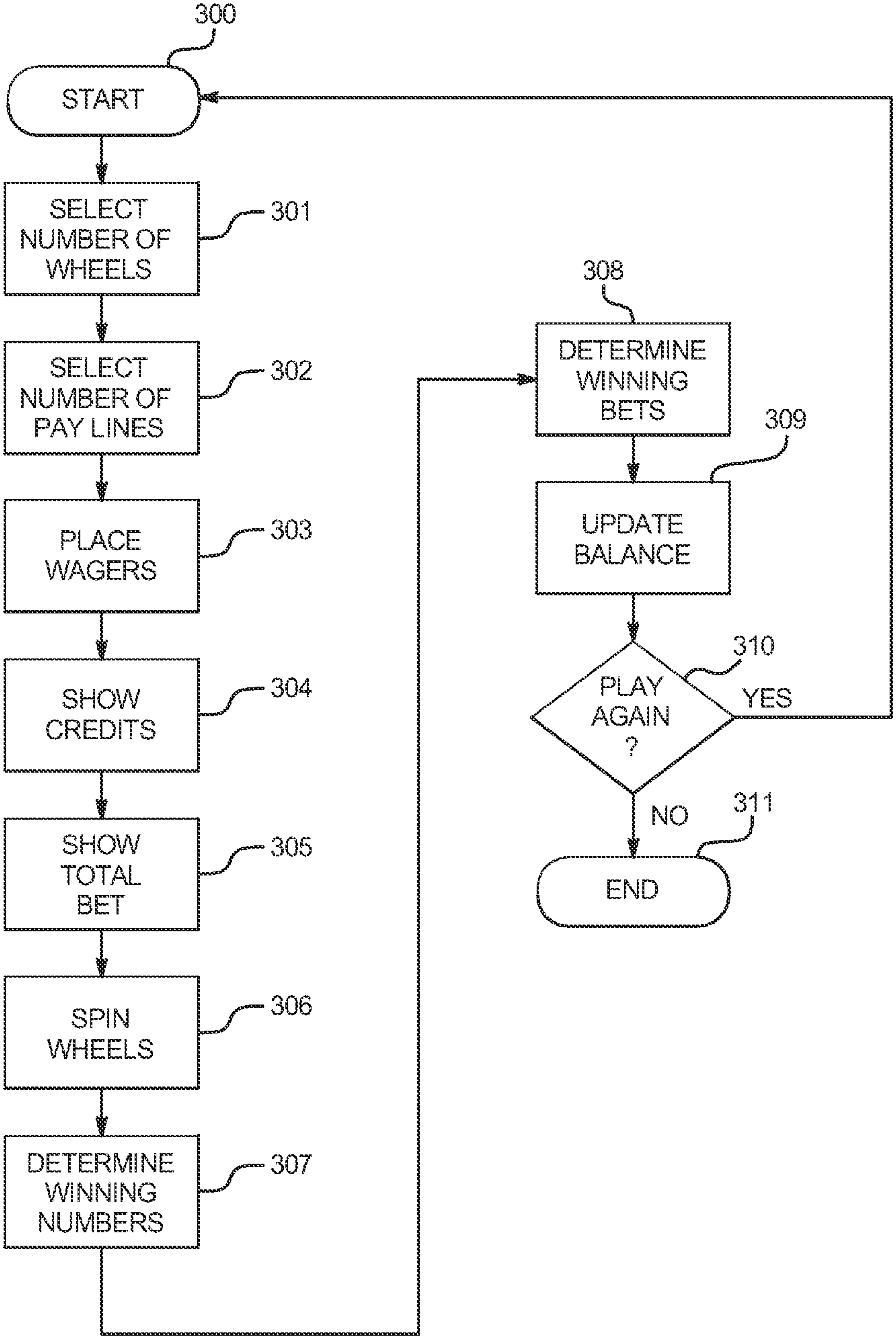
FIG. 2 is a flow chart diagram of an example of the steps involved in participating in a round of play of the present invention.

Referring to FIG. 2, a simplified flow diagram illustrating an example of the steps involved in participating in a round of play is shown. Play can be initiated in step 300 by inserting coins, paper currency, tokens, a debit card, a credit card, a smart card or the like to activate device 200 and provide the requisite payment arrangements. In a preferred embodiment, the player buys a number of credits before starting to play the game. If the player does not have a sufficient number of credits, the computing device prompts the player to insert more credits before allowing play to continue.

Figure 3:
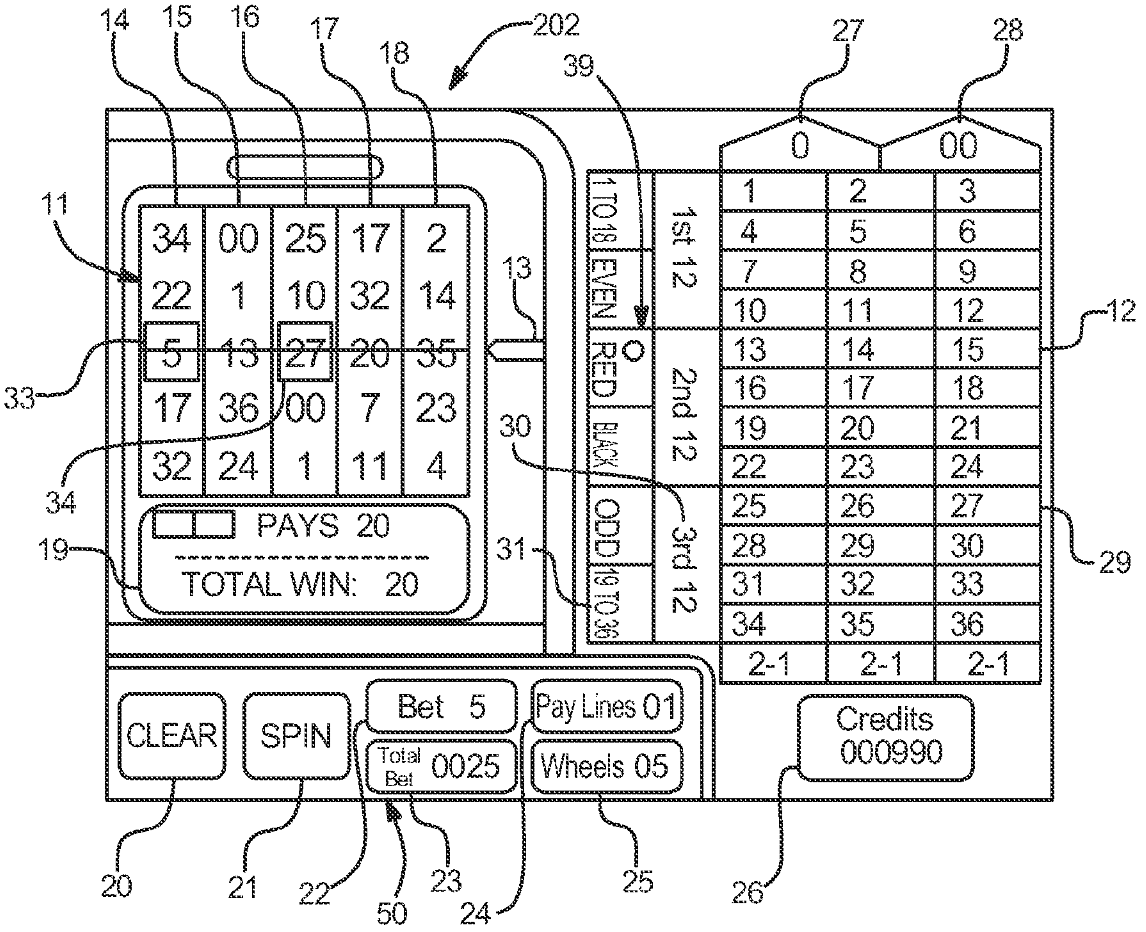
FIG. 3 is an illustration of a screen display showing, among other things, the winning numbers for five roulette wheels with one pay line.

After initiating the start of the game, the number of roulette wheels to be played is selected in step 301 through the use of the wheel number selector 25 (shown in FIG. 3). Selecting multiple wheels serves to result in multiple winning numbers, and depending on the bets that have been placed, multiple winning bets. While in the examples shown and disclosed, the maximum number of wheels is five, it is appreciated that other embodiments may include any number of multiple wheels and not depart from the scope of the present invention. In addition to selecting the number of wheels, the player may also select the number of pay lines in step 302 through the use of the line selector 30 (shown in FIG. 3). Selecting more than one pay line serves to create multiple winning numbers per wheel, hence multiplying the number of winning numbers, and increasing the likelihood of having multiple winning bets. While the illustrated embodiment allows up to a maximum number of five pay lines, it is appreciated that other embodiments may include any number of pay lines and not depart from the scope of the present invention.

Wagers are then placed in step 303 through the use of the bet selector 22 (shown in FIG. 3). In order to keep the player apprised of the available credit, the player's current balance may be shown in the credit display 26 in step 304. Once the wagers are placed, the total bet is calculated based on the number of wheels, pay lines and wagers and shown in the bet display 23 in step 305. In particular, the total bet comprises the amount wagered multiplied by the number of active wheels multiplied by the number of pay lines selected. The increase in the number of wheels and pay lines available can create more excitement and wagering by the players. As a result, potential casino revenue is increased over standard roulette play and wagering. While it is preferred that the same bet amount by applied to all wagers, it is appreciated that different bet amounts may be applied to different wagers and not depart from the scope of the present invention.

The selected numbers of wheels then are spun or made to appear to "spin" in step 306 by the operating system of microprocessor 201. A random number generator using a random function is used in step 307 to determine which of the possible roulette wheel numbers are selected as potential winning numbers (i.e., the number of wheels multiplied by the number of pay lines). The microprocessor also computes and controls the display of the possible winning numbers and determines which of the winning numbers comprise winning bets in step 308. Once it is determined whether any of the bets comprise winning bets, the balance in the player's account is updated accordingly in step 309. Likewise, the microprocessor and the software contained therein serve to compute and display the total bet, the credits, the remaining credits and all such numerical operations. Upon completion of the gaming activity, the device will display a message in step 310 inquiring whether it is desired to play another game. Otherwise, the game will end in step 311.

Referring now to FIGS. 3 though 9, the results of a series of different games having varying wagers, numbers of wheels and pay lines are shown. As shown in FIG. 3, the electronic screen display 202 preferably includes a wheel portion 11; a betting field 12; bet input and display portion 50; game buttons 20 and 21; and a total available balance display 26. The betting field 12 includes the possible bets available. In the example shown in the Figures, bets may be placed on: one or more specific numbers 1-36 (29), 0 (27) and/or 00 (28); particular numeric sections such as the "1st 12" numbers, the "2nd 12" numbers, and/or the "3rd 12" numbers (30); additional numeric sections such as "1 to 18" and/or "19 to 36" (31); even and/or odd numbers; and, red and/or black (39).

Wheel portion 11 shows five roulette wheels in play (14-18). The bet input and display portion 50 may include various displays including, but not limited to, displays for the number of pay lines selected 24, the number of wheels selected 25, the individual wager or bet amount 22 and the total bet 23, In the embodiment shown in the screen display in FIG. 3, the player has bet five credits, as shown in display 22, on each of five roulette wheels (14-18), as shown in display 25. A single pay line 13 was selected as shown in display 24. Accordingly, the total bet (as calculated by multiplying the wager (five credits) times the number of wheels (five) times the number of pay lines (one)), as shown in display 23, is twenty-five credits.

Game buttons 20 and 21 may be used to allow for the game to be cleared or played. In particular, clear button 20 may be touched, depressed or otherwise activated in a known way to clear, among other things, the results and/or all existing bets. Similarly, spinning of the wheels (14-18) may be initiated by touching, depressing or otherwise activating the spin button 21 in a known way.

In FIG. 3, the outcome of the spinning of five wheels with one pay line selected is shown. The potential winning numbers are those along pay line 13, namely 5, 13, 27, 20 and 35. Because five credits were bet on red, any red number landing along the pay line after the wheels are spun would be a winning number. In the present example, the payoff for a "red" bet is 2 for 1. As the wager was five credits, each red number would therefore pay ten credits. In this case, wheels 14 and 16 hit pay line 13 with 5 (33) and 27 (34), both of which are "red" numbers, so as to pay two times ten, or twenty credits, as shown in display 19. Because the player bet twenty-five credits and received a payoff of only twenty credits, the result was a net loss of five credits. Five credits are therefore subtracted from the total credits to yield 990 credits as shown in display 26.

Figure 4:
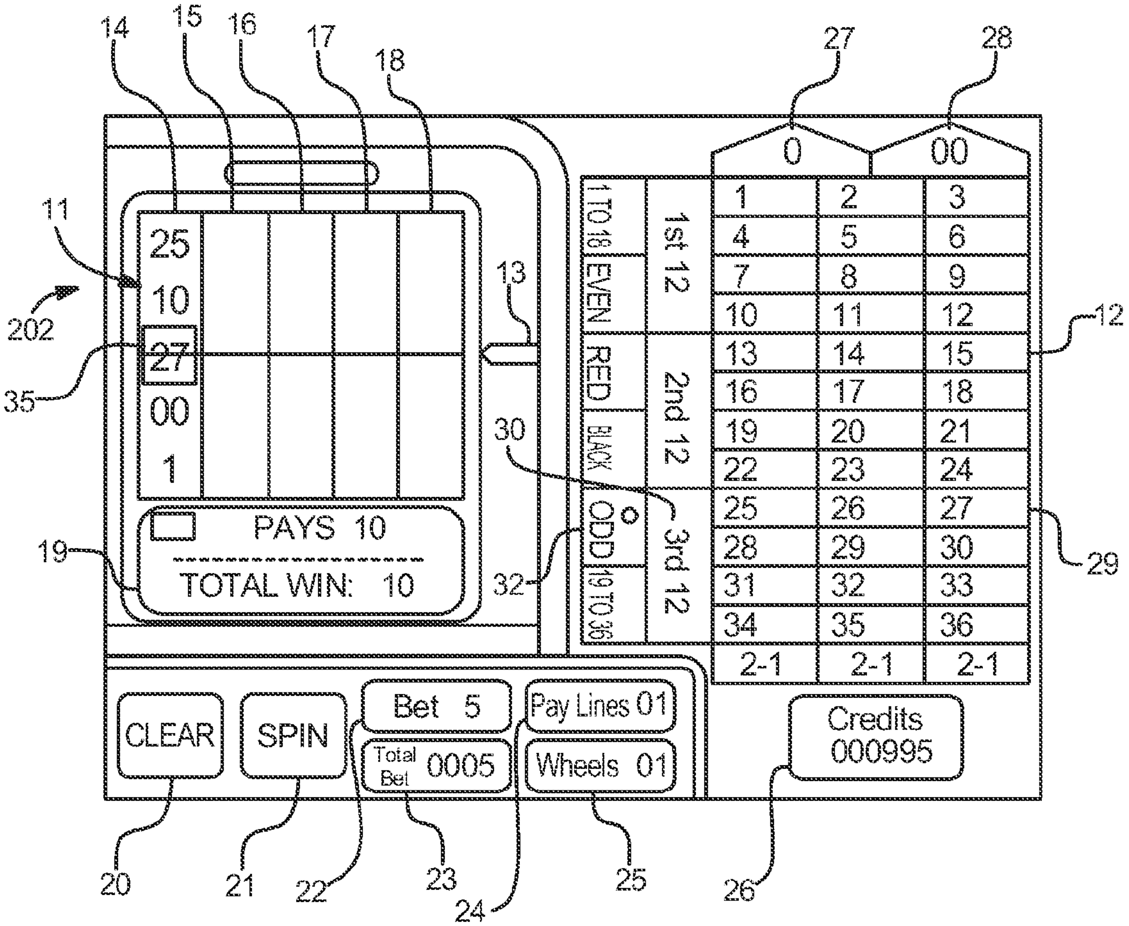
FIG. 4 is an illustration of a second screen display illustrating, among other things, the winning numbers for one roulette wheel with one pay line.

FIG. 4 illustrates the results after the game shown in FIG. 3 was cleared by pressing clear button 20 and the next game was played. In the example shown in FIG. 4, only one roulette wheel 14 and one pay line 13 were selected as shown by displays 25 and 24, respectively. Accordingly, wheels (15-18) are shown as empty. Referring to the betting field 12, the player bet five credits (22) on "odd" (32). Accordingly, the total bet is five credits (as calculated by multiplying the wager (five) times the number of wheels (one) times the number of pay lines (one)), as shown in display 23.

After the wheel 14 is "spun" and the random number generator determines the winning number of 27 (which is an "odd" number) (35), as shown along pay line 13, the winning bets are determined. In this example, the payoff is 2 for 1 for an "odd" bet. As 27 is an "odd" number and the player had bet five credits on "odd" (32), the game pays ten credits, as shown in display 19. The net win is thus ten credits minus the five credits bet, or five credits, which is then added to the total balance to yield 995 credits, as shown in display 26.

Figure 5:
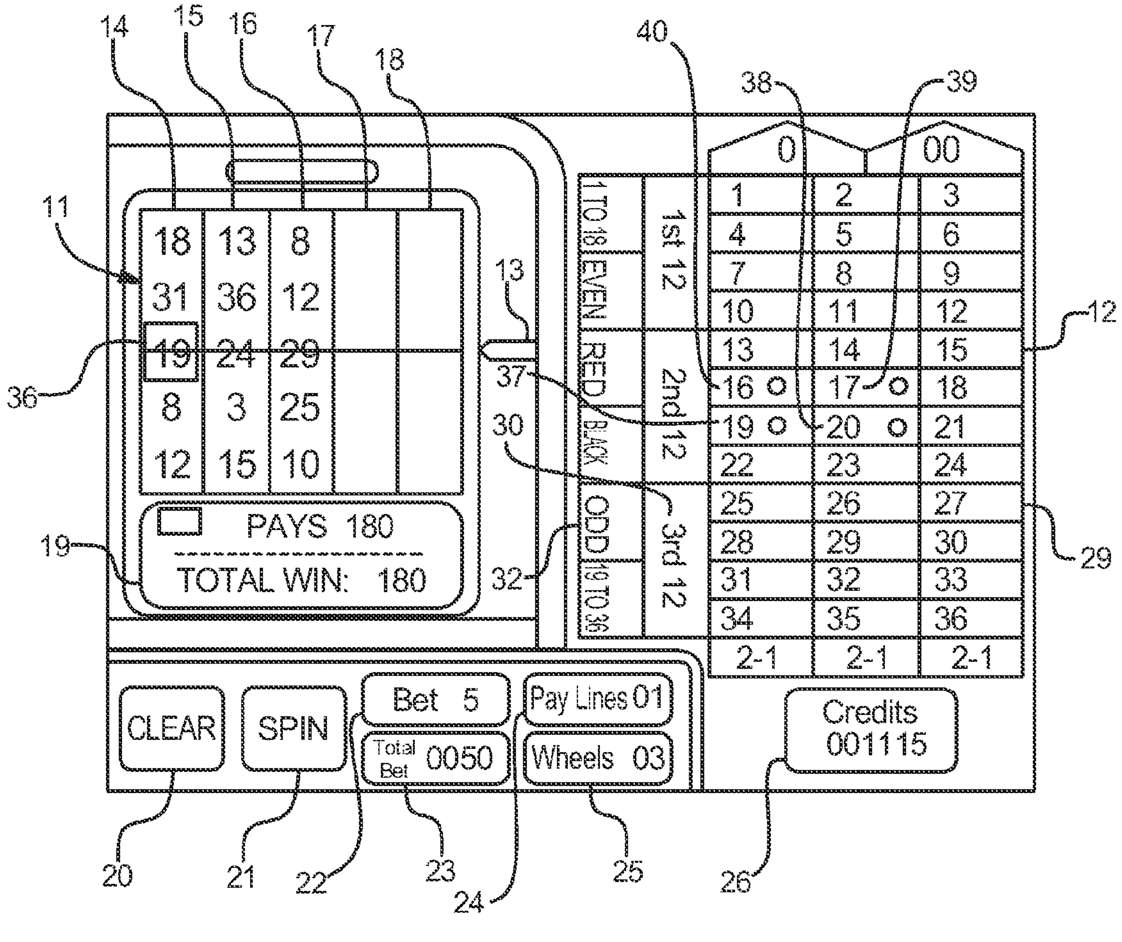
FIG. 5 is an illustration of a third screen display showing, among other things, the winning numbers for three roulette wheels with one pay line.

FIG. 5 illustrates the results of an additional game played after the example in FIG. 4. As shown in FIG. 4, three wheels (14-16) and one pay line 13 were selected for the game, as shown in displays 25 and 24. Bets of five credits (22) each were placed on the numbers 16 (40), 17 (39), 19 (37), and 20 (38). This makes for a total bet of five credits times four numbers times three wheels, or sixty credits, as shown in display 23. As shown in the wheel portion 11, the winning numbers from the "spin", as indicated by viewing the pay line 13, are the number 19 (36) from the first wheel 14, the number 24 from the second wheel 15, and the number 29 from the third wheel 16. Because the number 19 (36) was bet on (37), the bet on 19 (37) is a winning bet. As individual number bets normally pay 36 for 1, the total winnings would be thirty-six times five credits (the amount bet) which equals 180 credits, as shown in display 19. Accordingly, the net proceeds to the player would be 180 credits won minus 60 credits lost (the total bet), for a net result of 120 credits won. The net result is then added to the total balance shown in display 26 to indicate that the balance is 1115 credits.

Figure 6:
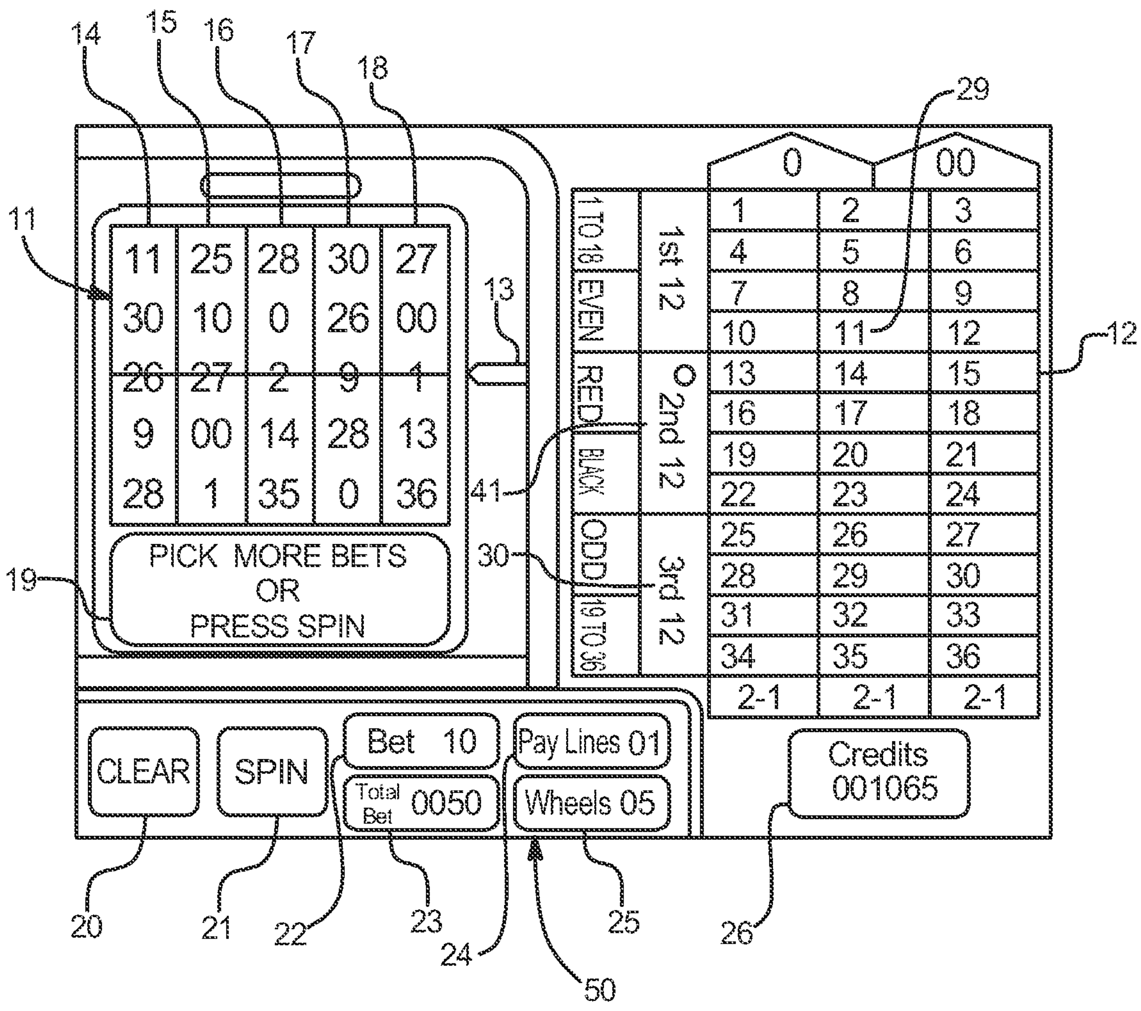
FIG. 6 is an illustration of a fourth screen display illustrating, among other things, five roulette wheels with one pay line.

After completion of the game shown in FIG. 5, the example shown in FIG. 6 illustrates a game where five wheels (14-18) and one pay line 13 are selected, as shown in displays 25 and 24. A ten credit bet is placed on the "2nd 12" (41). The total bet is thus ten credits times five wheels times one pay line, which equals fifty credits, as shown in display 23. Before the game is played, display 19 informs the player to place additional bets or press spin. The player may also change the number of wheels or pay ones desired for the game. In one embodiment, additional bets may be placed by pushing the bet input and display button 22 and selecting a bet on the betting field 12.

By pushing the spin button 21, the wheels are spun. Once the wheels stop spinning, the winning numbers are displayed. As shown in FIG. 6, the winning numbers along pay line 13 are 26, 27, 2, 9 and 1. However, since none of these numbers are within the "2nd 12" (i.e., 13 to 24), the player loses the fifty credit bet in its entirety and the display of remaining credits is updated to indicate the total balance of 1065, as shown in display 26.

Figure 7:
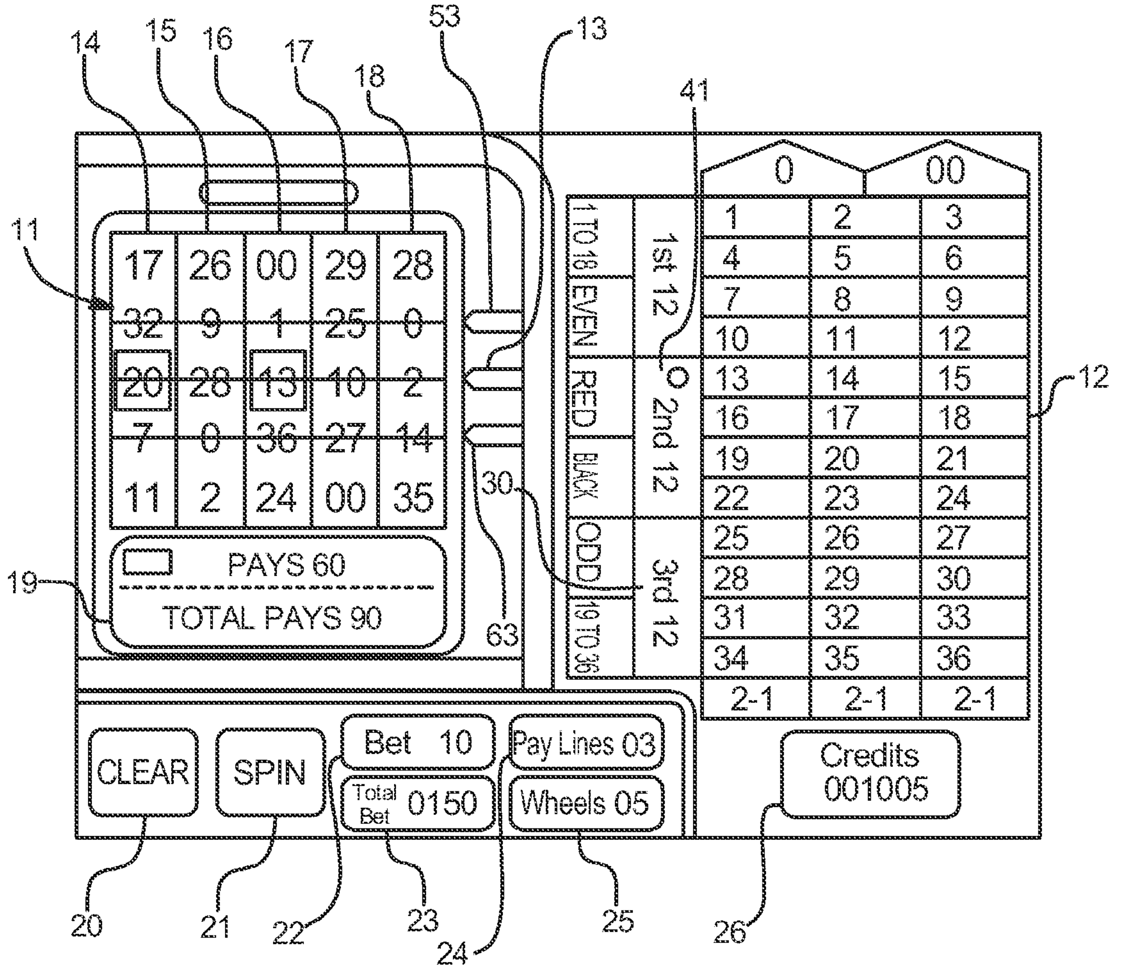
FIG. 7 is an illustration of a fifth screen display showing, among other things, the results of the spin for the second of three pay lines for five roulette wheels.
Figure 8:
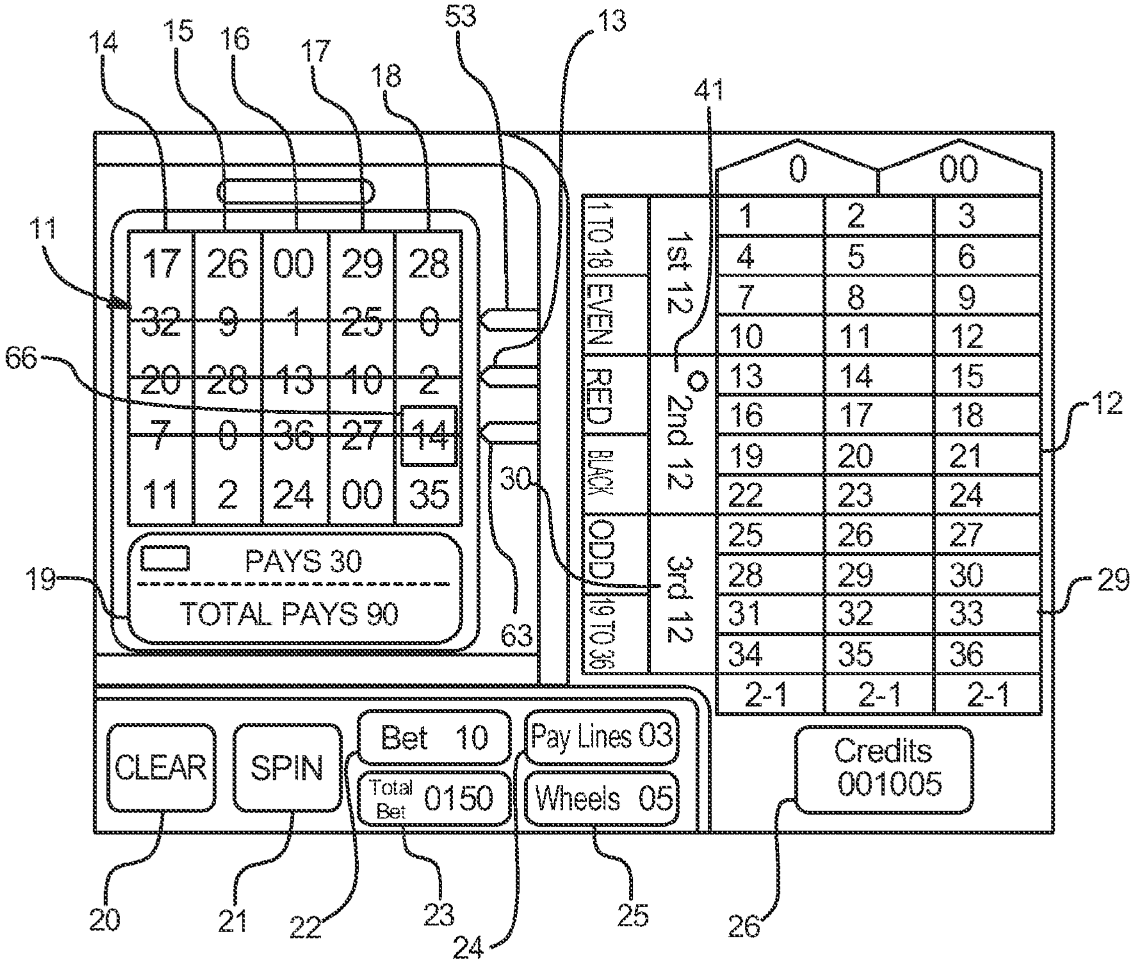
FIG. 8 is an illustration of a sixth screen display showing the results of the spin shown in FIG. 7 for the third pay line for the five roulette wheels.

A five-wheel, three-pay line example is provided in FIGS. 7 and 8. Because there are three pay lines, there are three potential winning numbers per wheel. As shown in the betting field 12, a ten credit bet is placed on "2nd 12" (41). Because there are five wheels (14-18) and three pay lines (53, 13 and 63) the total bet is five times three times ten credits or 150 credits. Because of the bet on "2nd 12" (41), the winning numbers are those numbers between 13 and 24 that appear along one of the pay lines. In this case, such winning numbers include 20 (46) and 13 (56) with respect to wheels 14 and 15, respectively, and middle pay line 13. In addition, as shown in FIG. 8, the number 14 (66) (which is the 4th number in the 4th wheel (18)) is a winner with respect to the 3rd pay line 63. In this example, the odds of a bet on the "2nd 12" are 3 for 1. Accordingly, the total payout is three winning numbers times three times ten credits, which equals 90 credits. Subtracting the amount bet (150 credits) from the amount won (90 credits) in this example therefore equals a net loss of 60 credits, as reflected in display 26, which has been updated to reflect 1005 total credits (which is down from the prior 1065 credits of FIG. 6).

Figure 9:
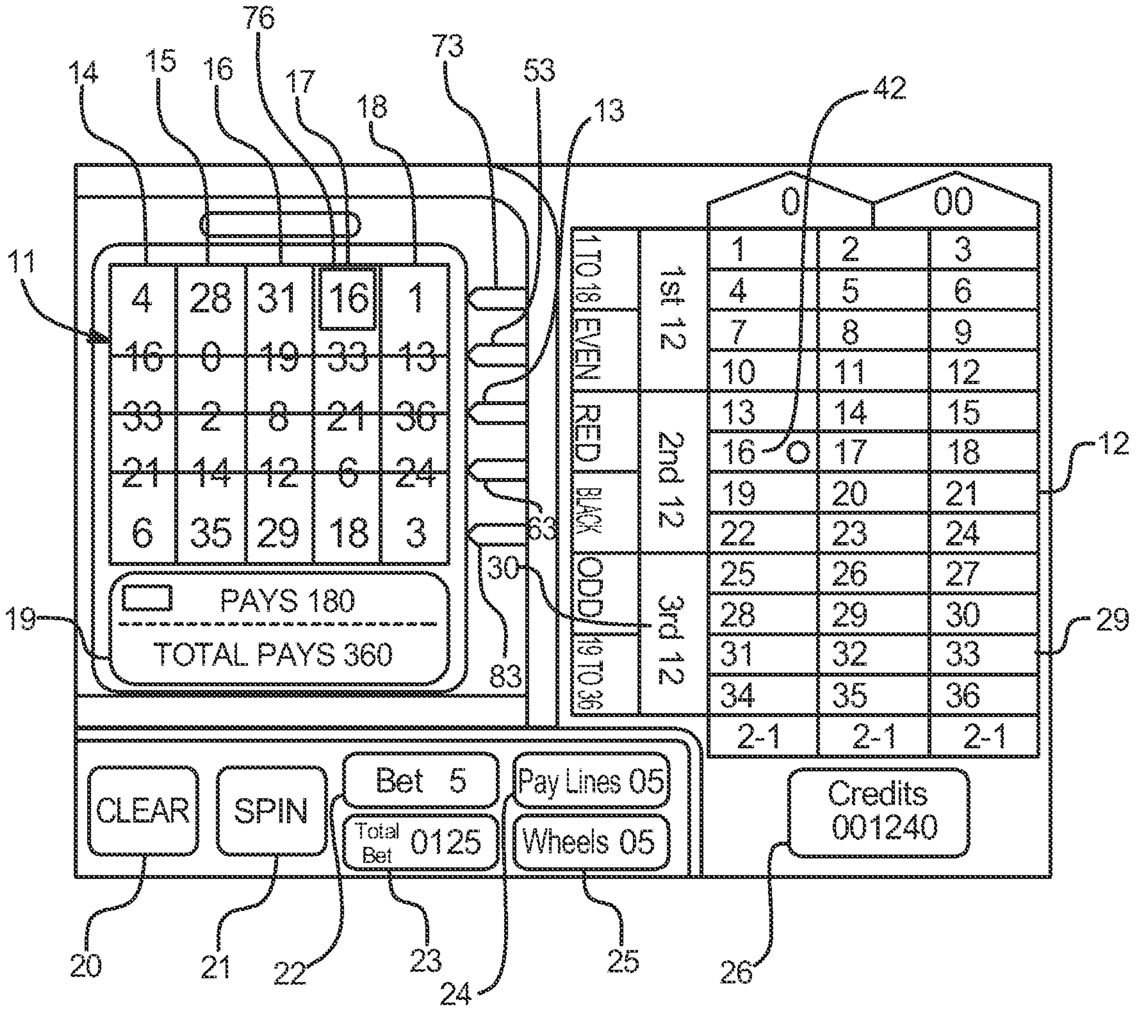
FIG. 9 is an illustration of a seventh screen display illustrating, among other things, the winning numbers for five roulette wheels with five pay lines.

Referring now to FIG. 9, the results of a game are displayed wherein five wheels (14-18) and five pay lines (73, 53, 13, 63 and 83) were selected. As shown in display 22 and betting field 12, a five-credit bet is placed on the number 16 (42). The total bet is five wheels times five pay lines times five credits, which equals 125 credits, as shown in display 23. As indicated above, the wheels may be cleared and spun by pressing buttons 20 and 21.

The result of the 'spin' is that the number 16 (76) comes up as a winning number twice: once along pay line 73 on the 4th wheel (17) and once along pay line 53 on the 1st wheel (14). Because each individual number "hit" pays 36 for 1, the payout is thirty-six times five credits times two hits, which equals 360 credits. Accordingly, the display 19 shows that each hit of "16" pays 180 credits and that the total win is 360 credits. In the example of FIG. 9, the payout may include a bonus because more than one of the wheels came up with the same winning number on one of the pay lines. Such bonuses can be pre-selected to provide a special payout depending upon how many wheels come up with a specified number as the winning number and winning bet.

For example, a bonus, jackpot, progressive, or other special payout can be made when the outcome includes a particular number selection or one which is repeated a selected number of times on different wheels. For example, a special payout could be made if: a particular "number of the day" or "match number" came up; or, if the same number appeared a particular predetermined number of times on multiple roulette wheels. The special payout could be further constrained to be three adjacent wheels having the same number, or perhaps only the first three wheels. By making it practical for a player to play virtually any number of roulette games simultaneously, the invention allows the creation of these special wheel combination payouts.

The foregoing description of one or more embodiments of the invention have been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims as set forth below.

The invention is claimed as follows:

1. A gaming system comprising:

a housing;

at least one processor;

at least one display device supported by the housing;

a plurality of input devices supported by the housing and including an acceptor; and at least one memory device that stores a plurality of instructions which, when executed by the at least one processor, cause the at least one processor to operate with the at least one display device and the plurality of input devices to:

(a) establish a credit balance associated with a monetary value after the acceptor receives a physical item associated with the monetary value;

(b) display a plurality of rotors, each of the plurality of rotors including a plurality of different outcomes, each of the plurality of different outcomes being associated with one of a plurality of different first characteristics and one of a plurality of different second characteristics;

(c) place a wager after an actuation of a wager button is received, said wager being associated with at least one of: (i) one of the plurality of different first characteristics, and (ii) one of the plurality of different second characteristics, the credit balance being decreasable by said wager;

(d) display each of the plurality of rotors spinning independent of one another;

(e) for each of the plurality of rotors:

(i) determine one of the outcomes of said rotor, (ii) stop said rotor from spinning, and (iii) indicate the determined outcome of said rotor;

(f) determine any awards based on said received wager and the indicated outcomes; and (g) display any determined awards.

2. The gaming system of claim 1, wherein the plurality of rotors share a common axis of rotation and at least one of the rotors is positioned within a perimeter of another one of the rotors.

3. The gaming system of claim 2, wherein the plurality of instructions, when executed by the at least one processor, cause the at least one processor to determine a designated award when a designated outcome is indicated for each of a designated quantity of at least two adjacent rotors.

4. The gaming system of claim 1, wherein the plurality of instructions, when executed by the at least one processor, cause the at least one processor to determine a designated award when a designated outcome is indicated for each of a designated quantity of at least one of the rotors.

5. The gaming system of claim 4, wherein the designated quantity is at least two.

6. A gaming system comprising:

a housing;

at least one processor;

at least one display device supported by the housing;

a plurality of input devices supported by the housing and including an acceptor; and at least one memory device that stores a plurality of instructions which, when executed by the at least one processor, cause the at least one processor to operate with the at least one display device and the plurality of input devices to:

(a) establish a credit balance associated with a monetary value after the acceptor receives a physical item associated with the monetary value;

(b) display a plurality of roulette wheels, each of the plurality of roulette wheels including a plurality of different outcomes;

(c) receive, from a player, a selection of at least one of the roulette wheels;

(d) place a wager after an actuation of a wager button is received, the credit balance being decreasable by said wager;

(e) for each selected roulette wheel:

(i) display said selected roulette wheel spinning;

(ii) determine one of the outcomes of said selected roulette wheel, (iii) stop said selected roulette wheel from spinning, and (iv) indicate the determined outcome of said selected roulette wheel;

(f) determine any awards based on said received wager and the determined at least one outcome; and (g) display any determined awards, the credit balance being increasable by any determined awards.

7. The gaming system of claim 6, wherein the plurality of roulette wheels are the same.

8. The gaming system of claim 6, wherein the plurality of instructions, when executed by the at least one processor, cause the at least one processor to, when at least two of the roulette wheels are selected, determine a designated award when a designated outcome is indicated for each of a designated quantity of at least two of the roulette wheels.

9. A method of operating a gaming system, said method comprising:

(a) causing at least one processor to execute a plurality of instructions stored in at least one memory device to operate with at least one display device to display a plurality of rotors, each of the plurality of rotors including a plurality of different outcomes, each of the plurality of different outcomes being associated with one of a plurality of different first characteristics and one of a plurality of different second characteristics;

(b) causing the at least one processor to execute the plurality of instructions stored in the at least one memory device to operate with at least one input device to receive a wager from a player, said wager being associated with at least one of: (i) one of the plurality of different first characteristics, and (ii) one of the plurality of different second characteristics;

(c) causing the at least one processor to execute the plurality of instructions stored in the at least one memory device to operate with the at least one display device to display each of the plurality of rotors spinning independent of one another;

(d) for each of the plurality of rotors:

(i) causing the at least one processor to execute the plurality of instructions stored in the at least one memory device to determine one of the outcomes of said rotor, (ii) causing the at least one processor to execute the plurality of instructions stored in the at least one memory device to operate with the at least one display device to stop said rotor from spinning, and (iii) causing the at least one processor to execute the plurality of instructions stored in the at least one memory device to operate with the at least one display device to indicate the determined outcome of said rotor;

(e) causing the at least one processor to execute the plurality of instructions stored in the at least one memory device to determine any awards based on said received wager and the indicated outcomes; and (f) causing the at least one processor to execute the plurality of instructions stored in the at least one memory device to operate with the at least one display device to display any determined awards.

10. The method of claim 9, wherein the plurality of rotors share a common axis of rotation and at least one of the rotors is positioned within a perimeter of another one of the rotors.

11. The method of claim 10, which includes causing the at least one processor to execute the plurality of instructions stored in the at least one memory device to determine a designated award when a designated outcome is indicated for each of a designated quantity of at least two adjacent rotors.

12. The method of claim 9, which includes causing the at least one processor to execute the plurality of instructions stored in the at least one memory device to determine a designated award when a designated outcome is indicated for each of designated quantity of at least one of the rotors.

13. The method of claim 12, wherein the designated quantity is at least two.

14. The method of claim 9, which is provided through a data network.

15. The method of claim 14, wherein the data network is an internet.

16. The method of claim 9, which includes, if a physical item associated with a monetary value is received by an acceptor, causing the at least one processor to execute the plurality of instructions stored in the at least one memory device to establish a credit balance for the player based at least in part on the monetary value associated with the received physical item, the wager being deducted from the credit balance.

17. A method of operating a gaming system, said method comprising:

(a) causing at least one processor to execute a plurality of instructions stored in at least one memory device to operate with at least one display device to display a plurality of roulette wheels, each of the plurality of roulette wheels including a plurality of different outcomes;

(b) causing the at least one processor to execute the plurality of instructions stored in the at least one memory device to operate with at least one input device to receive, from a player, a selection of at least one of the roulette wheels;

(c) causing the at least one processor to execute the plurality of instructions stored in the at least one memory device to operate with the at least one input device to receive a wager from a player;

(d) for each selected roulette wheel:

(i) causing the at least one processor to execute the plurality of instructions stored in the at least one memory device to operate with the at least one display device to display said selected roulette wheel spinning;

(ii) causing the at least one processor to execute the plurality of instructions stored in the at least one memory device to determine one of the outcomes of said selected roulette wheel, (iii) causing the at least one processor to execute the plurality of instructions stored in the at least one memory device to operate with the at least one display device to stop said selected roulette wheel from spinning, and (iv) causing the at least one processor to execute the plurality of instructions stored in the at least one memory device to operate with the at least one display device to indicate the determined outcome of said selected roulette wheel;

(e) causing the at least one processor to execute the plurality of instructions stored in the at least one memory device to determine any awards based on said received wager and the determined at least one outcome; and (f) causing the at least one processor to execute the plurality of instructions stored in the at least one memory device to operate with the at least one display device to display any determined awards.

18. The method of claim 17, wherein the plurality of roulette wheels are the same.

19. The method of claim 17, which includes causing the at least one processor to execute the plurality of instructions stored in the at least one memory device to, when at least two of the roulette wheels are selected, determine a designated award when a designated outcome is indicated for each of a designated quantity of at least two of the roulette wheels.

20. The method of claim 17, which is provided through a data network.

21. The method of claim 20, wherein the data network is an internet.

22. The method of claim 17, which includes, if a physical item associated with a monetary value is received by an acceptor, causing the at least one processor to execute the plurality of instructions stored in the at least one memory device to establish a credit balance for the player based at least in part on the monetary value associated with the received physical item, the wager being deducted from the credit balance.

* * * * *